(12) United States Patent
Horowitz

(10) Patent No.: US 9,738,295 B1
(45) Date of Patent: Aug. 22, 2017

(54) FOLDING TABLE HAVING PULL-OUT WHEELS

(71) Applicant: Brian Horowitz, Foothill Ranch, CA (US)

(72) Inventor: Brian Horowitz, Foothill Ranch, CA (US)

(*) Notice: Subject to any disclaimer, the term of this patent is extended or adjusted under 35 U.S.C. 154(b) by 0 days.

(21) Appl. No.: 15/204,894

(22) Filed: Jul. 7, 2016

Related U.S. Application Data

(60) Provisional application No. 62/330,702, filed on May 2, 2016.

(51) Int. Cl.
| | |
|---|---|
| *A47B 3/00* | (2006.01) |
| *B62B 1/12* | (2006.01) |
| *A47B 3/087* | (2006.01) |
| *A47B 13/16* | (2006.01) |
| *A47B 3/08* | (2006.01) |
| *F21V 33/00* | (2006.01) |
| *B62B 1/26* | (2006.01) |
| *F21Y 115/10* | (2016.01) |

(52) U.S. Cl.
CPC .............. *B62B 1/12* (2013.01); *A47B 3/087* (2013.01); *A47B 3/0818* (2013.01); *A47B 13/16* (2013.01); *F21V 33/0012* (2013.01); *B62B 1/26* (2013.01); *B62B 2202/32* (2013.01); *F21Y 2115/10* (2016.08)

(58) Field of Classification Search
CPC ....... B62B 21/12; B62B 1/26; B62B 2202/32; A47B 3/0818; A47B 3/087; A47B 13/16; F21Y 33/0012; F21V 33/0012

USPC .......... 108/115–135, 168–178, 144.11, 146, 108/147.18, 147.19, 147.21
See application file for complete search history.

(56) References Cited

U.S. PATENT DOCUMENTS

| | | | | | |
|---|---|---|---|---|---|
| 2,499,177 | A | * | 2/1950 | Baughman | G01S 11/023 180/271 |
| 2,529,789 | A | * | 11/1950 | Simon | B60B 33/06 108/143 |
| 3,362,358 | A | * | 1/1968 | Farish, III | A47B 3/083 108/170 |
| 3,410,232 | A | * | 11/1968 | Bills | A47B 3/0912 108/146 |
| 5,201,536 | A | * | 4/1993 | Bono | A47B 85/06 280/30 |
| 5,249,438 | A | * | 10/1993 | Rhaney | A45C 5/14 16/113.1 |

(Continued)

*Primary Examiner* — Daniel J Troy
*Assistant Examiner* — Timothy M Ayres
(74) *Attorney, Agent, or Firm* — Morland C. Fischer

(57) ABSTRACT

A folding table having first and opposite ends that are rotatable relative to one another to lie either face-to-face when the folding table is in a folded configuration or end-to-end when the folding table is in an unfolded configuration. The table includes a pair of pull-out wheels on which the table can roll in its folded configuration. A retractable chair rack can be pulled outwardly from one of the table ends to engage a stack of folding chairs to be transported when the table is in its folded configuration and functioning as a cart. The pair of pull-out wheels are pivotally coupled to the table and rotatable between a first position lying outside and adjacent opposite sides of the table when the table is in its folded configuration and a second position lying below the bottom of the table when the table is in its unfolded configuration.

31 Claims, 15 Drawing Sheets

(56) References Cited

U.S. PATENT DOCUMENTS

| | | | | |
|---|---|---|---|---|
| 5,356,197 | A * | 10/1994 | Simic | A47C 13/00 |
| | | | | 280/204 |
| 5,465,985 | A * | 11/1995 | Devan | A45C 5/146 |
| | | | | 280/30 |
| 5,586,775 | A * | 12/1996 | Cheng | B62B 1/12 |
| | | | | 280/38 |
| 5,855,038 | A * | 1/1999 | Dispense | A47B 37/04 |
| | | | | 16/34 |
| 6,871,861 | B2 * | 3/2005 | Hernandez, Jr. | B25H 5/00 |
| | | | | 248/129 |
| 7,574,964 | B2 * | 8/2009 | Farber | A47B 3/087 |
| | | | | 108/115 |
| 8,418,292 | B2 * | 4/2013 | Rozewicz | A61G 13/00 |
| | | | | 280/30 |
| 9,440,668 | B1 * | 9/2016 | Chen | B62B 3/102 |
| 2006/0236905 | A1 * | 10/2006 | Neunzert | A47B 3/0915 |
| | | | | 108/169 |
| 2008/0149002 | A1 * | 6/2008 | Gardner | A47B 3/08 |
| | | | | 108/6 |
| 2015/0196446 | A1 * | 7/2015 | Yue | A61G 13/105 |
| | | | | 5/620 |
| 2015/0300627 | A1 * | 10/2015 | Wang | F21V 33/0012 |
| | | | | 108/23 |

* cited by examiner

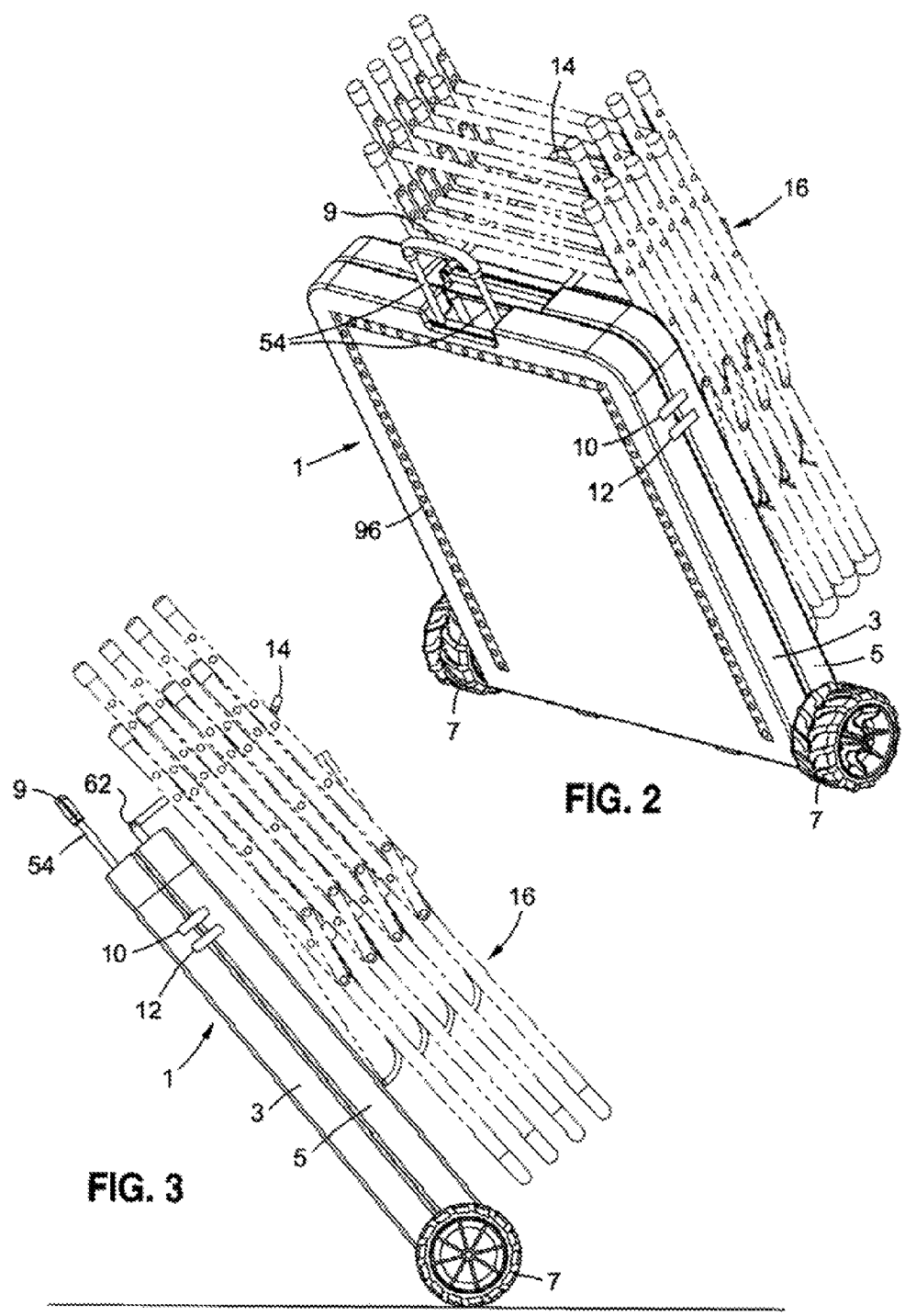

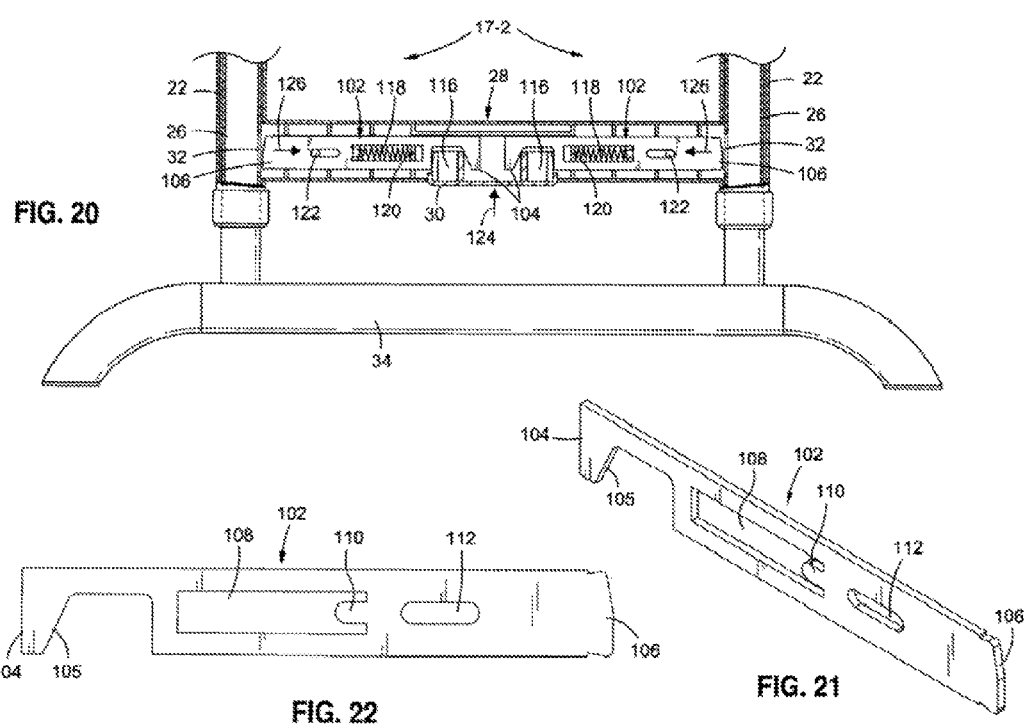

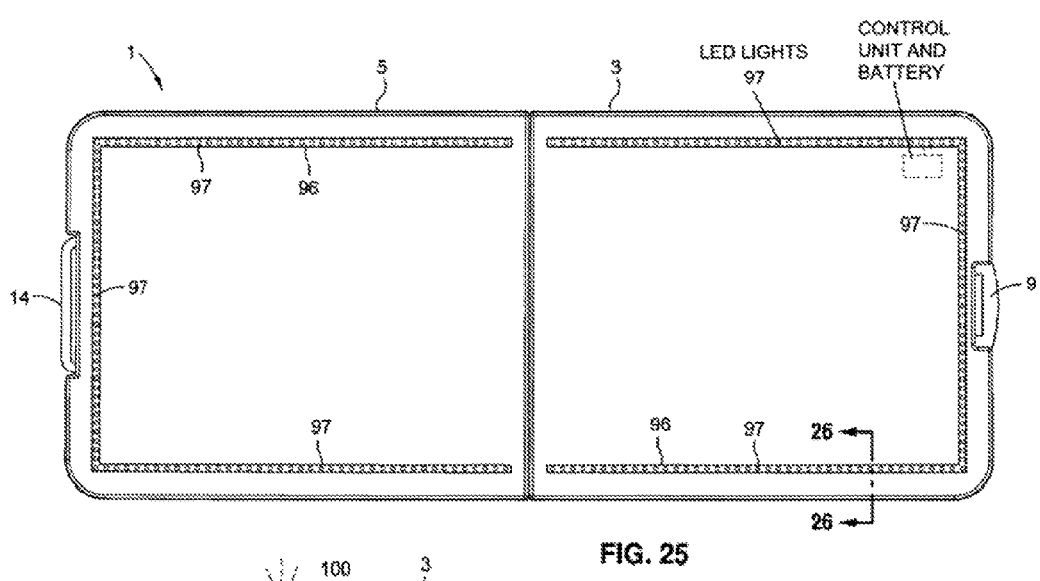
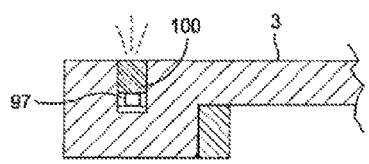
FIG. 25
FIG. 26

FOLDING TABLE HAVING PULL-OUT WHEELS

CROSS REFERENCE TO RELATED APPLICATIONS

This application is related to Provisional Patent Application No. 62/330,702 filed May 2, 2016.

BACKGROUND OF THE INVENTION

1. Field of the Invention

This invention relates to a folding table having a pair of pull-out wheels that can be positioned either adjacent the opposite sides or below the bottom of the table so that opposite ends of the table can be rotated around a pivot between an elongated unfolded configuration and a compact folded configuration at which to be transported in a motor vehicle or rolled as a cart from place-to-place when the wheels are positioned at the sides of the table. The folding table also has a pair of adjustable height leg assemblies which are deployed when the table is in its unfolded configuration and the wheels are tucked below the bottom of the table to enable a variety of articles to be laid on the table including, but not limited to, those associated with a picnic or an outdoor sporting event.

2. Background Art

From time-to-time, a group of people wish to attend an outdoor event at which food, beverages and eating utensils will be made available to the attendees. By way of example, the outdoor event may be a picnic or occur outside a field or stadium at which sports are played. In many cases, nothing of suitable size is readily available at the outdoor event around which the attendees can gather and on which the food, beverages and eating utensils can be laid and made easily accessible.

Traditional tables that are used to accommodate the needs of a large number of attendees are typically too large to be transported in a motor vehicle. Moreover, the traditional tables are often too heavy and bulky to be easily transported to the site of the event by a single individual. Even in the case where a table can be manipulated between folded and unfolded configurations, several attendees will still be required to carry the table and chairs as may be necessary to hold the event. In the alternative, a single event planner will be required to make several trips back and forth between his vehicle and the site to prepare the event for the attendees.

What would therefore be preferable is a folding table having a compact folded configuration by which to be conveniently transported in a motor vehicle and a pair of non-obtrusive wheels that can be rotated outwardly from the table so as to lie adjacent the opposite sides thereof so that the table can be easily rolled from place-to-place by a single user. It would also be preferable for the table to function as a cart in its folded configuration and be able to carry with it a stack of folding chairs during a single trip from the user's vehicle to the site of the event.

SUMMARY OF THE INVENTION

In general terms, a folding table is disclosed having first and opposite ends that can be rotated around a pivot towards one another so as to lay face-to-face one over the other in a folded configuration at which the table can be transported in a motor vehicle or function as a cart. With the table in its folded configuration, a pair of pull-out wheels lie outside and adjacent opposite sides of the table at which to enable the table to be easily rolled from place-to-place by a single individual. To this end, a pull-out handle is pulled outwardly from the bottom of the first end of the table in its folded configuration at which the individual can apply a pulling force to cause the table to roll on its wheels. A retractable chair rack can also be pulled outwardly from the bottom of the opposite end of the table in its folded configuration to engage a stack of folding chairs and thereby enable the stack to be transported atop the opposite table end. A string of light emitting diodes extends around and is recessed within each end of the folding table. With the table in its unfolded configuration, the light emitting diodes can be illuminated in one or more colors to represent the colors associated with a sports team, a country, etc.

The first and opposite ends of the folding table can also be rotated around the pivot away from one another so as to lie end-to-end with the table in an unfolded configuration at which to enable a variety of articles (e.g., food, beverages and eating utensils) to be laid thereon for use at a picnic, outdoor sporting event, or the like. In this case, the pair of pull-out wheels are rotated to a non-obtrusive position tucked below the bottom of the table so as not to interfere with those seated around the table. A leg assembly is rotatable downwardly from each end of the folding table to support the table above the ground. Each leg assembly has a pair of slidably adjustable hollow leg tubes that are rotatably connected at first ends thereof to the bottom of the folding table and a pair of telescoping legs that stand upwardly from a foot of the table for receipt within the opposite ends of respective ones of the hollow legs tubes. A leg release push-button actuated leg locking cross bar extends between the hollow leg tubes. The cross bar has a pair of locking tabs located at opposite ends that are urged by springs into receipt by respective locking slots from a plurality of locking slots that are formed in and spaced axially along each of the pair of telescoping legs to lock the legs in place within the leg tubes so that the table is held at a first elevation above the ground. When a pushing force is manually applied to the leg release push-button, the locking tabs of the leg locking cross bar are pulled out of the locking slots in the telescoping legs to permit the legs to slide upwardly or downwardly through the hollow leg tubes in order to selectively adjust the elevation of the table above the ground.

The pair of pull-out wheels are pivotally coupled to one end of the folding table and adapted to be rotated between a first position adjacent opposite sides of the table in its folded configuration and a second, non-obtrusive position when the table is in its unfolded configuration so as to lie below the bottom of the table. The axle of each pull-out wheel of the folding table is attached to one end of a wheel axle tube, and the opposite end of the wheel axle tube is pivotally coupled to a pivot bolt which extends between a pair of axle tube braces that are connected to the bottom of the table. A coil spring runs axially through the wheel axle tube between the pivot bolt and a spring locking pin that extends laterally through the wheel axle tube.

When a pull-out wheel is to be rotated between its first and second positions relative to the table, pulling and rotational forces are simultaneously applied to the wheel by which the pull-out wheel and the wheel axle tube are correspondingly pulled away from the table and rotated with one another around the pivot bolt while the coil spring lying within the wheel axle tube is stretched. Once the wheel and its wheel axle tube have been rotated, the pulling force is terminated, and the spring contracts by which to automatically pull the wheel and the wheel axle tube towards the pivot bolt. At the same time, wheel locking pegs which project from the wheel axle tube are pulled by the contracting spring into locking engagement with locking detents that are formed in the pair of axle tube braces so as to hold the wheel axle tube and the wheel attached thereto in place.

BRIEF DESCRIPTION OF THE DRAWINGS

FIGS. 1-3 show a folding table according to a preferred embodiment of this invention being in a folded configuration and including a pair of pull-out wheels positioned outside and adjacent opposite sides of the table by which the table can be rolled from place-to-place as a cart and further including a retractable chair rack by which a stack of folding chairs can be engaged and transported atop one end of the table;

FIG. 20 shows the leg locking cross bar of FIG. 19 and a leg release push-button being manually actuated to cause the leg locking tabs at the opposite ends of the leg locking cross bar to be removed from the pair of telescoping legs by which to enable the pair of hollow leg tubes to slide over the pair of telescoping legs so that the elevation of the folding table above the ground can be selectively adjusted;

FIG. 21 is an enlarged perspective view of one of the pair of push-button actuated leg locking tabs that is located at one end of the leg locking cross bar shown in FIGS. 19 and 20;

FIG. 22 is a side view of the leg locking tab shown in FIG. 21;

FIG. 25 shows the top of the folding table in its unfolded configuration having strings of light emitting diodes recessed therein and extending around the opposite ends thereof; and FIG. 26 is a cross-section taken along lines 26-26 of FIG. 25 to illustrate details of one light emitting diode from the strings of light emitting diodes that are recessed within the top of the folding table.

DESCRIPTION OF THE PREFERRED EMBODIMENT

Figure 1:
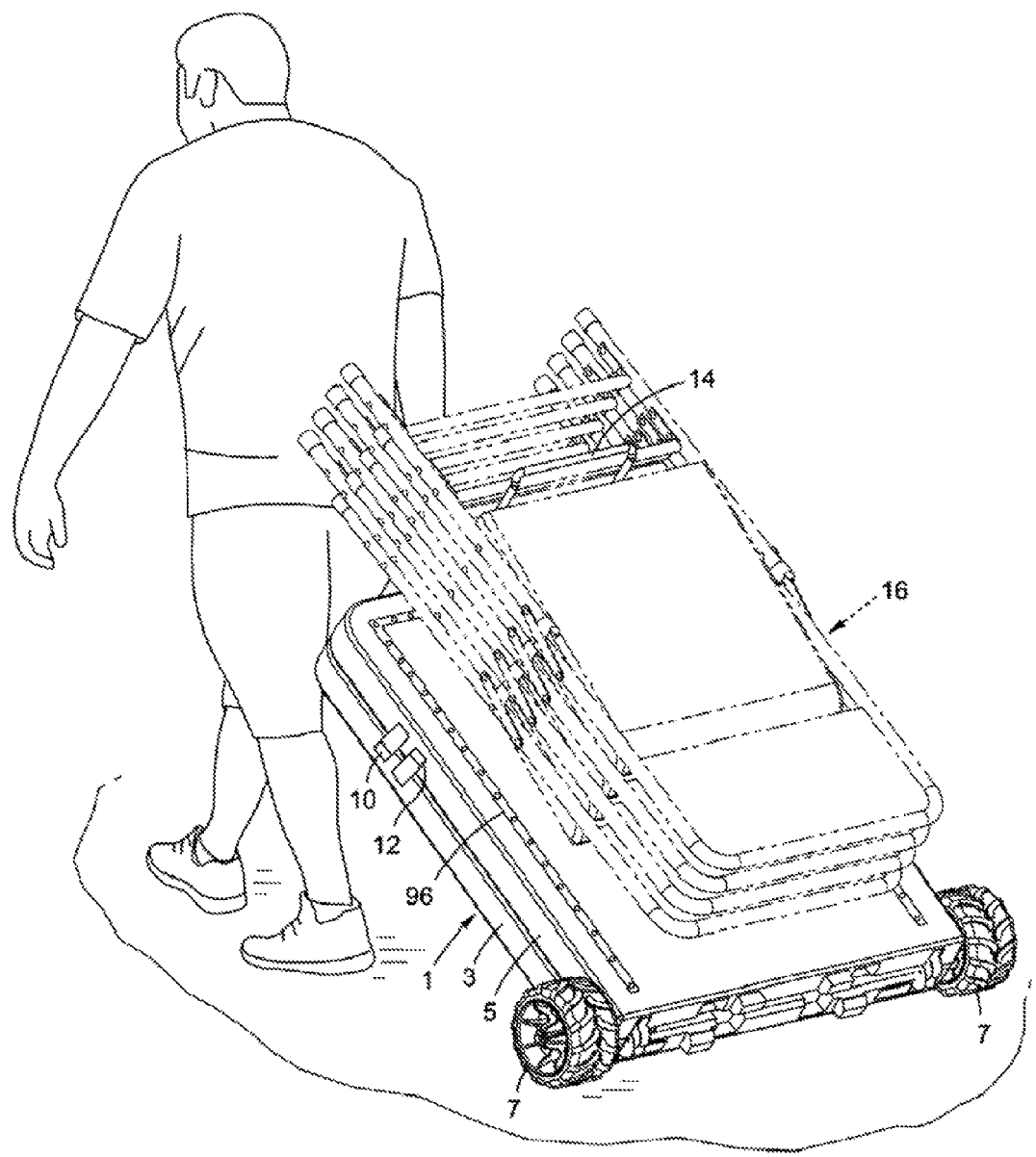

Referring initially to FIGS. 1-3 of the drawings, there is shown a folding table 1 in a compact folded configuration at which to be conveniently stored or transported in a motor vehicle. By way of example, the folding table 1 is manufactured from a durable blow molded plastic material. The folding table 1 has opposite ends 3 and 5 which are joined together at and rotatable around a pivot bolt (designated 72 in FIGS. 10-12) so that the table ends can be moved towards one another and held face-to-face one above the other when the table is in its compact folded configuration as shown.

As will be described in greater detail hereinafter, the folding table 1 has a pair of pull-out wheels 7 that are rotatable between outside and inside positions relative to the bottom of the table. With the table 1 at its folded configuration of FIGS. 1-3 and with the wheels 7 at their outside position lying adjacent the opposite sides of the table, the table 1 can function as a cart and be rolled over a surface in order to be moved easily from place-to-place by a single user. In this regard, a pull-out handle 9 carried by the end 3 of table 1 can be gripped and pulled by the user to cause the table 1 in its folded configuration to roll from one location to another.

Pairs of locking latches 10 and 12 are locked between the opposite ends 3 and 5 of the table 1 to hold the ends face-to-face one another when the table is in its folded configuration of FIGS. 1-3. The locking latches 10 and 12 are unlocked to permit the opposite ends 3 and 5 of the folding table 1 to be rotated (at pivot bolt 72) so as to be in an unfolded configuration (of FIGS. 4 and 5) at which the opposite ends 3 and 5 are aligned end-to-end one another. One such pair of locking latches 10 and 12 is located at each side of the folding table 1.

As one important advantage of this invention, a retractable chair rack 14 is carried by the table end 5. The retractable chair rack 14 can be pulled outwardly from the table end 5 and rotated at a pair of hinges (designated 62 and best shown in FIGS. 14-16) through an angle of ninety degrees so as to lie in perpendicular alignment with the top of the table 1. The retractable chair rack 14 is bent at the hinges 62 and positioned so that a stack of one or more conventional folding chairs 16 (shown in phantom lines in FIGS. 1-3) can be engaged and conveniently carried by the chair rack 14 atop the table end 5 when the table 1 has been rotated to its folded configuration to be pulled at handle 9 and rolled by a single user from one place to another.

Figure 4:
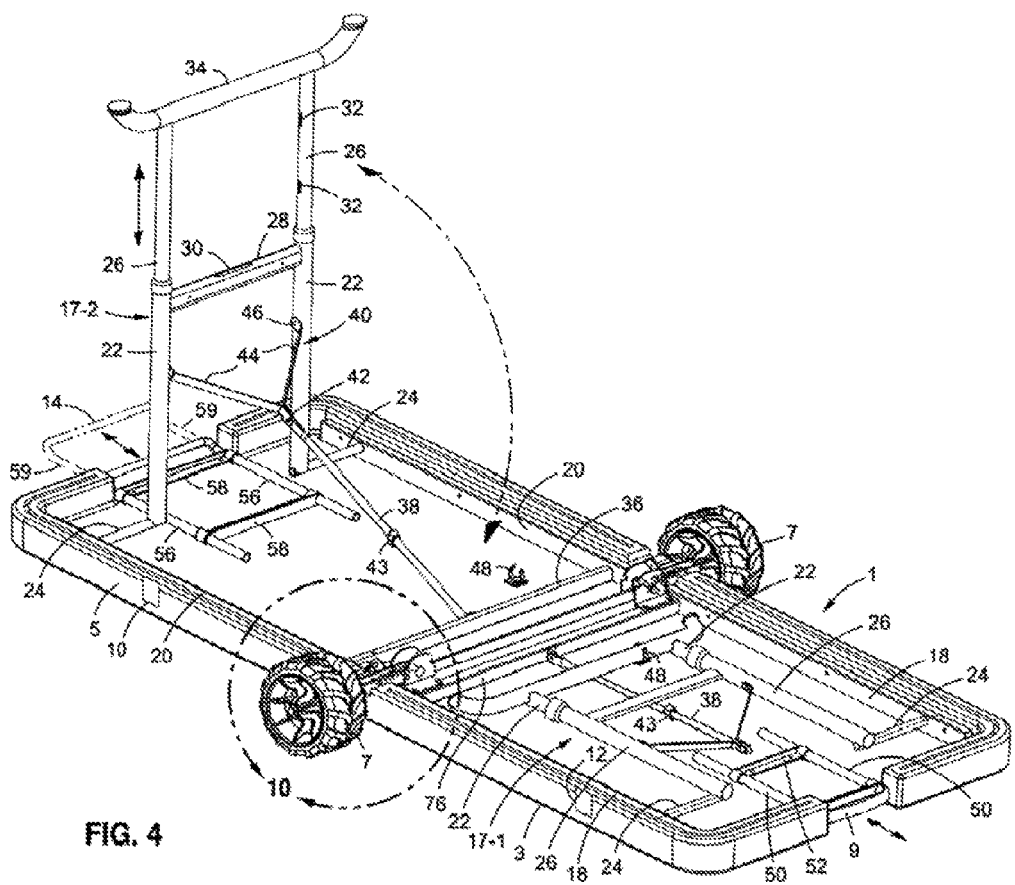
FIG. 4 shows the bottom of the folding table of FIG. 1 in a partially unfolded configuration with one of a pair of rotatable leg assemblies being deployed and the pair of pull-out wheels pivotally coupled to and extending outwardly from the bottom of the table so as to lie adjacent opposite sides of the table.
Figure 5:
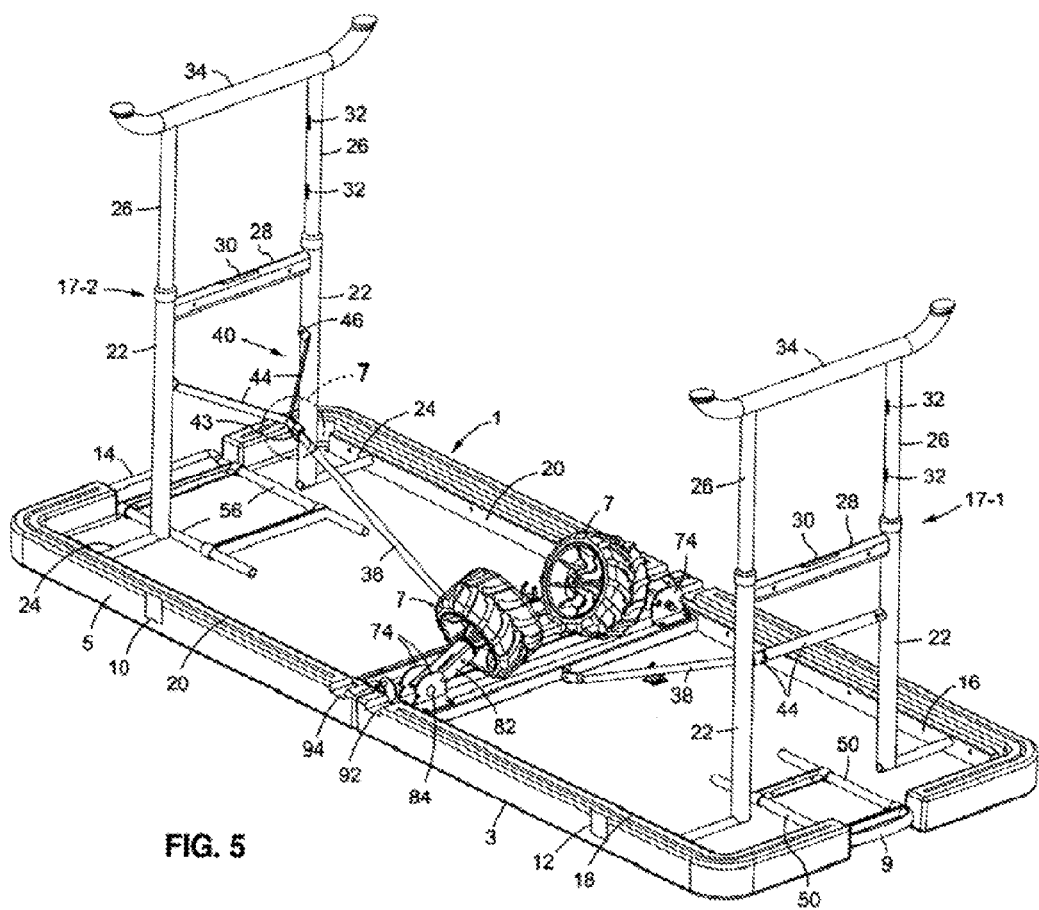
FIG. 5 shows the bottom of the folding table in a fully unfolded configuration with the pair of rotatable leg assemblies being deployed and the pair of pull-out wheels rotated relative to and lying below the bottom of the table.
Figure 6:
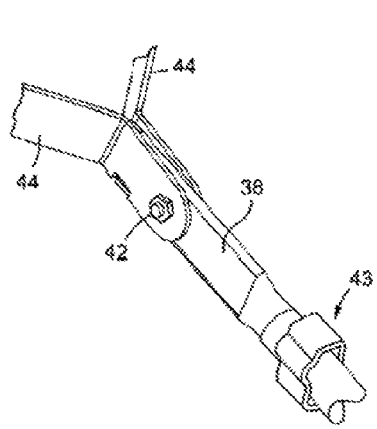
FIG. 6 shows a locking sleeve slidable on a leg assembly support arm towards a pair of leg brace support arms from one of the pair of leg assemblies shown in FIG. 5.

The folding table 1 has a pair of identical rotatable and height adjustable leg assemblies 17-1 and 17-2 that are connected to opposite ends 3 and 5 of the table to support the table 1 above the ground when the table is in its unfolded configuration shown in FIGS. 4 and 5. The bottom of the folding table 1 is shown in FIGS. 4 and 5 having a pair of rigid frame members 18 and 20 extending along opposite sides of respective ones of the ends 3 and 5 thereof. The leg assemblies 17-1 and 17-2 are pivotally coupled between the frame members 18 and 20 and rotatable relative to the bottom of the table 1 below the table ends 3 and 5. For the purpose of convenience, only the leg assembly 17-2 that is located below the table end 5 will be described, although the components and operation of each of the pair of rotatable leg assemblies 17-1 and 17-2 are identical. Therefore, identical reference numbers are used for both leg assemblies.

The leg assembly 17-2 includes a pair of hollow leg tubes 22 that are coupled at first ends thereof by means of rotatable coupling rods 24 to respective frame members 20 at opposite sides of the table end 5. The coupling rods 24 are fixedly connected to and extend outwardly from the hollow leg tubes 22. A pair of telescoping table legs 26 are slidably received through the opposite ends of respective ones of the hollow leg tubes 22. A leg locking cross bar 28 runs between and through the hollow leg tubes 22 so as to communicate with the telescoping legs 26 that are surrounded by leg tubes 22. A manually actuated leg release push-button 30 is located on the leg locking cross bar 28. As will be described in greater detail while referring to FIGS. 19-22, when the leg release push-button 30 is depressed, the telescoping table legs 26 can be pushed downwardly and slide inwardly through the hollow leg tubes 22 to enable the unfolded table 1 to be held at a first elevation above the ground. In the alternative, with the leg release push-button 30 depressed, the telescoping legs 26 can be pulled upwardly and slide outwardly through the hollow leg tubes 22 to enable the unfolded table 1 to be held at a different elevation above the ground.

Depressing and releasing the leg release push-button 30 causes leg latches (designated 102 in FIGS. 19 and 20) located at opposite ends of the leg locking cross bar 28 to be moved inwardly of or withdrawn from a plurality of axially aligned leg locking slots 32 that are formed in and spaced axially from one another along each of the telescoping table legs 26. When the leg release push-button 30 is depressed, the leg latches 102 of the cross bar 28 are withdrawn from the locking slots 32, so that the telescoping legs 26 can slide in or out of the hollow leg tubes 22, such that the height of the legs 26 can be selectively adjusted relative to the bottom of the table 1 (best shown in FIGS. 17 and 18). When the leg release push-button 30 is released, the leg latches 102 are urged back into receipt by the locking slots 32, such that the telescoping legs 26 are locked in place and the height of the legs 26 relative to the bottom of the table 1 is now fixed.

A foot 34 extends across the telescoping legs 26 of the rotatable leg assembly 17-2. When the position of the table legs 26 relative to the bottom of the folding table 1 has been selectively adjusted as just explained and the folding table 1 is in its unfolded configuration with the opposite ends 3 and 5 thereof arranged end-to-end one another and the leg assemblies 17-1 and 17-2 rotated downwardly from the bottom of the table as shown in FIG. 5, the feet 34 of the pair of rotatable leg assemblies 17-1 and 17-2 will sit on and support the table above the ground (best shown in FIGS. 17 and 18).

That is, the rotatable leg assemblies 17-1 and 17-2 are adapted to rotate with the rotatable coupling rods 24 upwardly and away from or downwardly and towards the bottom of table 1 between an upstanding position, when the folding table 1 will be used in its unfolded configuration as shown in FIG. 5, and a collapsed position, when the folding table will be used in its folded configuration as shown in FIGS. 1-3. To accomplish the foregoing, the pair of hollow leg tubes 22 of each leg assembly (e.g., 17-2) within which the pair of telescoping table legs 26 are slidably received are connected to a leg assembly support bar 36 (best shown in FIG. 4) which extends laterally below the bottom of the table 1 between the frame members 20 lying at opposite sides of the table end 5.

More particularly, one end of a leg assembly support arm 38 is pivotally connected to the leg assembly support bar 36. The opposite end of the leg assembly support arm 38 is pivotally connected to one end of a Y-shaped leg assembly brace 40 by a coupling screw 42 (best shown in FIG. 4) extending therebetween. A pair of leg brace support arms 44 which are located at the opposite end of the Y-shaped leg assembly brace 40 are coupled to respective ones of the hollow leg tubes 22 by means of pivot pins 46 (only one of which being visible). With the rotatable leg assemblies 17-1 and 17-2 in their upstanding position as shown in FIG. 5, a locking sleeve 43 is slidable upwardly along each leg assembly support arm 38 to surround the coupling screw 42 and thereby prevent the leg brace support arms 44 of brace 40 from rotating at coupling screw 42 relative to the leg assembly support arm 38. Details of the locking sleeve 43 and its movement along a leg assembly support arm 38 into surrounding engagement with a coupling screw 42 will be provided while referring to FIGS. 6-9.

After the locking sleeve 43 of one of the rotatable leg assemblies (e.g., 17-2) is first moved downwardly along the leg assembly support arm 38 and away from coupling screw 42 as shown in FIG. 4, a downward pushing force applied to the leg assembly support arm 38 and a rotational force simultaneously applied to the leg assembly 17-2 will cause the upstanding hollow leg tubes 22 and the telescoping legs 26 carried thereby to rotate downwardly towards the bottom of the table 1. In particular, the hollow leg tubes 22 will rotate together with the rotatable coupling rods 24 which extend outwardly therefrom to the opposing frame members 20. The leg assembly support arm 38 will now be able to rotate downwardly with the hollow leg tubes 22 at the coupling screw 42 until the leg assembly support arm 38 lies substantially flush against the bottom of the table 1. In this case, the rotatable leg assembly 17-2 of the folding table 1 will now lie at its collapsed position adjacent the bottom of the end 5 of the table 1 in the same manner as the other rotatable leg assembly 17-1 that is shown in FIG. 4 will lay in its collapsed position adjacent the bottom of the opposite table end 3. With the rotatable leg assemblies 17-1 and 17-2 in their collapsed position, the foot 34 of each leg assembly is captured and held in place adjacent the bottom of the table by a locking clip 48.

Figure 14:
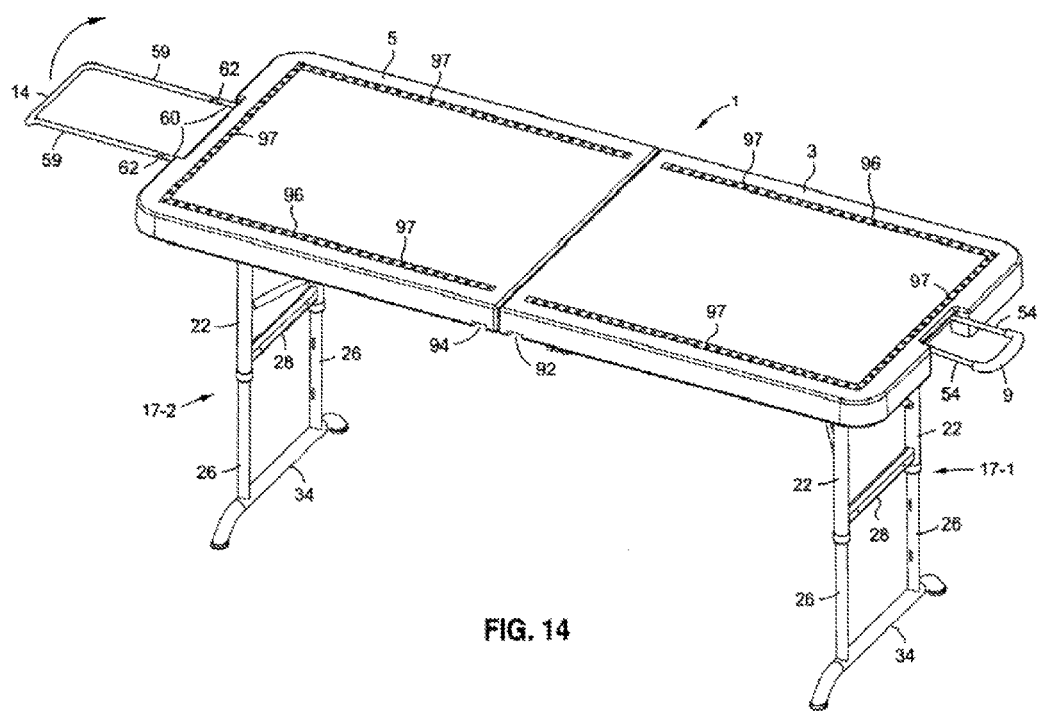
FIGS. 14 and 15 show the folding table in its unfolded configuration standing on the pair of rotatable leg assemblies with the pair of pull-out wheels lying below the bottom of the table and with a pull-out handle and a retractable chair rack pulled outwardly from opposite ends of the table.
Figures 15, 16:
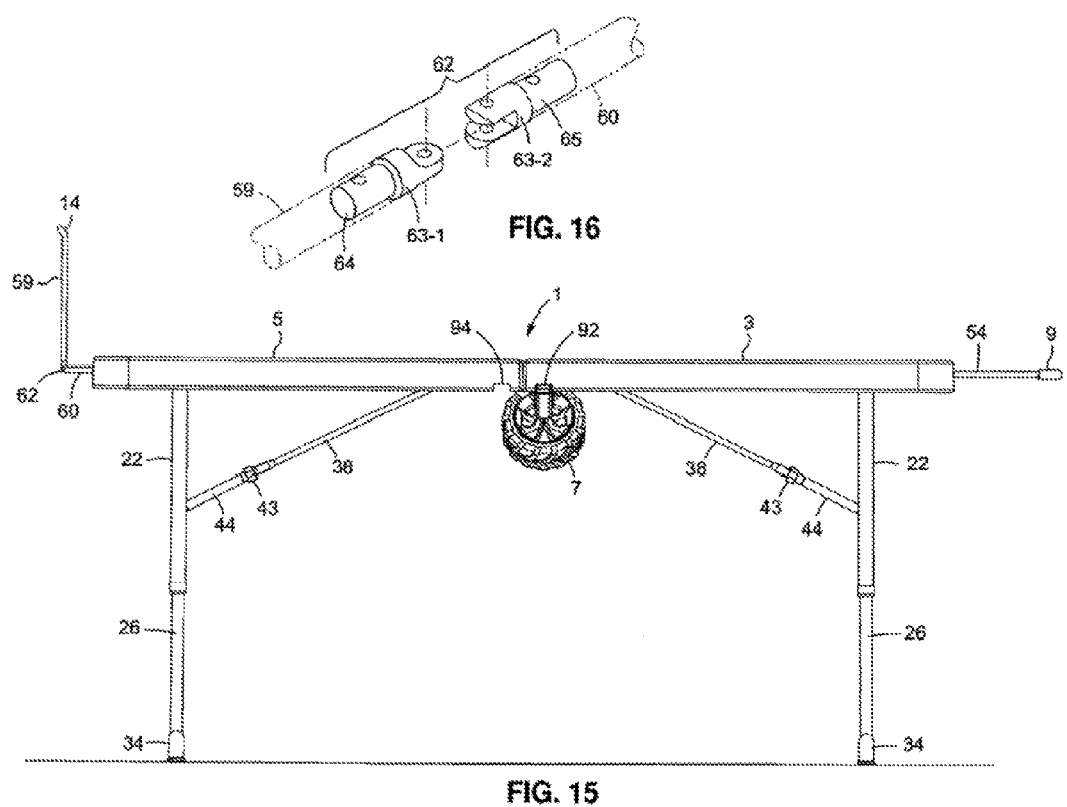
FIG. 16 is an exploded view of a hinge located within the retractable chair rack of FIGS. 14 and 15 so that the chair rack can be bent at the hinge to engage and carry a stack of folding chairs in the manner shown in FIGS. 1-3.

As is best shown in FIG. 4, a pair of hollow handle tubes 50 lie at the bottom of the folding table 1 below the first end 3 thereof. A handle tube cross bar 52 extends between and embraces the handle tubes 50. The handle tube cross bar 52 is affixed to the bottom of the table 1 to hold the hollow handle tubes 50 in place underneath the table end 3. As is best shown in FIGS. 14 and 15, the pull-out handle 9 includes a pair of telescoping handle legs 54 which are slidably received by respective ones of the hollow handle tubes 50. When the table 1 is in its folded configuration as shown in FIGS. 1-3, a pulling force applied to the handle 9 causes the telescoping handle legs 54 to slide outwardly from the handle tubes 50 so that the handle can be grasped and pulled to cause the table to roll from place-to-place on its wheels 7. A pair of locking pins (not shown) prevent the handle legs 54 from being pulled completely out of the hollow handle tubes 50. When the folding table 1 is in its unfolded configuration as shown in FIG. 5, a pushing force is applied to the handle 9, whereby to cause the handle legs 54 to slide inwardly of the hollow handle tubes 50 below the table.

As is also best shown in FIG. 4, a pair of hollow chair rack tubes 56 lie at the bottom of the folding table 1 below the opposite end 5 thereof. A pair of chair rack cross bars 58 extend between and embrace the chair rack tubes 56. The chair rack cross bars 58 are affixed to the bottom of the table 1 to hold the hollow chair rack tubes 56 in place underneath the table end 5. The retractable chair rack 14 includes a pair of hollow side rails 59 that are coupled by the aforementioned hinges 62 to a pair of hollow telescoping chair rack legs (designated 60 and best shown in FIGS. 14-16). The telescoping chair rack legs 60 are slidably received by respective ones of the hollow chair rack tubes 56 below the bottom of the folding table 1. When the table 1 is in its folded configuration of FIGS. 1-3 to be rolled from place-to-place, a pulling force applied to the chair rack 14 causes the telescoping chair rack legs 60 to slide outwardly from the chair rack tubes 56 so that the side rails 59 can be rotated at the hinges 62 relative to the chair rack legs 60.

In this regard, and referring briefly to FIGS. 14-16, the retractable chair rack 14 is shown with its telescoping chair rack legs 60 pulled outwardly from the hollow chair rack tubes 56 which are held at the bottom of the folding table 1 below the table end 5. A pair of locking pins (not shown) prevent the chair rack legs 60 from being pulled completely out of the chair rack tubes 56. A hinge 62 is coupled between each of the pair of side rails 59 of chair rack 14 and a respective one of the pair of chair rack legs 60. More particularly, each hinge 62 includes male and female pivot joints 63-1 and 63-2 (best shown in FIG. 16) that are positioned one within the other and pivotally coupled (i.e., interlocked) together by a fastener (not shown). The male pivot joint 63-1 includes a cylindrical coupling tail 64 which is slidably received and held in place within the hollow side rail 59 by a fastener (not shown) extending therebetween. The female pivot joint 63-2 also includes a cylindrical coupling tail 65 which is slidably received and held in place within the opposing hollow chair rack leg 60. Thus, the side rails 59 of the chair rack 14 can be rotated at the hinges 62 and bent upwardly (best shown in FIG. 15) and away from the chair rack legs 60 so as to lie perpendicular to the table end 5 and thereby be angled to extend through and engage the legs of the stack of folding chairs 16 in the manner shown in FIGS. 1-3.

By virtue of the foregoing, with the folding table 1 in its folded configuration and functioning as a cart, one or more folding chairs 16 may be stacked on top of the end 5 of the table 1 to be carried by the chair rack 14 and conveniently transported with the table by a single individual using a single hand to grasp and pull the handle 9. When the folding table 1 is in its unfolded configuration of FIGS. 4 and 5, the side rails 59 are bent downwardly into axial alignment with the telescoping legs 60 (best shown in FIG. 14), and a pushing force is applied to the retractable chair rack 14 to cause the pair of telescoping chair rack legs 60 to slide inwardly of the chair rack tubes 56 below the bottom of the table.

Figure 7:
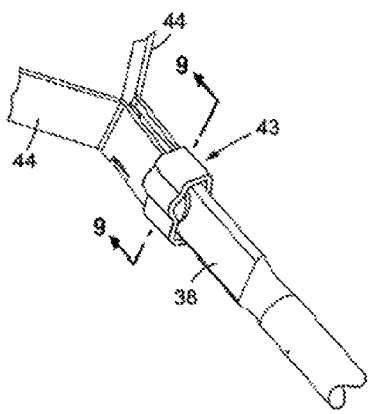
FIG. 7 is an enlarged detail taken from FIG. 5 showing the locking sleeve of FIG. 6 moved along the leg assembly support arm and into surrounding engagement with a pivot that extends through both the leg assembly support arm and the pair of leg brace support arms.
Figure 8:
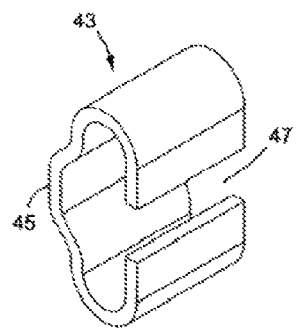
FIG. 8 is an enlarged perspective view of the locking sleeve shown in FIGS. 6 and 7.
Figure 9:
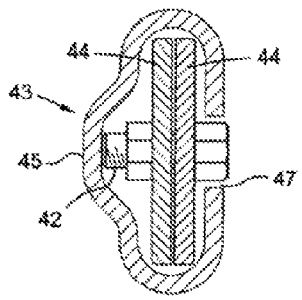
FIG. 9 is a cross section through the locking sleeve taken along lines 9-9 of FIG. 7.

FIGS. 7-9 of the drawings illustrate details of the locking sleeves 43 which were briefly described while referring to FIGS. 4 and 5 as sliding upwardly along respective ones of the leg assembly support arms 38 of the leg assemblies 17-1 and 17-2 that are located below the opposite ends 3 and 5 of the folding table 1. Each locking sleeve 43 has a generally C-shape so as to surround and ride along a leg assembly support arm 38. When they are pushed upwardly along the support arms 38 as shown in FIG. 7, the locking sleeves 43 surround the coupling screws 42 at which each leg assembly support arm 38 is pivotally connected to a pair of leg brace support arms 44. In particular, when the leg assemblies 17-1 and 17-2 are rotated upwardly and away from the bottom of the table 1 to their upstanding position shown in FIG. 5 at which the table is in its unfolded configuration, a locking sleeve 43 is moved into surrounding engagement with a coupling screw 42 to prevent the leg assembly support arm 38 from rotating at screw 42 downwardly and towards the bottom of the table. In this case, the leg assemblies 17-1 and 17-2 are locked in their upstanding position to prevent an inadvertent rotation thereof and a possible collapse of the table 1.

Each C-shaped locking sleeve 43 (best shown in FIG. 8) is preferably manufactured from metal and has a dimple or outwardly extending dome 45 located at one side thereof and a continuous slot 47 located at the opposite side. Each locking sleeve 43 is positioned at a first, lower position along a leg assembly support arm 38 (best shown in FIG. 6) at which to permit the leg brace support arms 44 to rotate at the coupling screw 42 at the same time that one of the leg assemblies (e.g., 17-2 of FIG. 4) is rotated downwardly to its collapsed position adjacent the bottom of the table 1. The locking sleeve 43 is slidable upwardly along the leg assembly support arm 43 to a second position at which to lie in surrounding engagement with the coupling screw 42 (best shown in FIG. 7) to thereby prevent the leg brace support arms 44 from rotating at the coupling screw 42 relative to the leg assembly support arm 38. By virtue of the foregoing, the corresponding leg assembly (e.g., 17-2 of FIG. 5) will be locked in its upstanding position at which to hold the folding table 1 above the ground.

To achieve this advantage, the dome 45 at one side of the C-shaped locking sleeve 43 is dimensioned to frictionally engage the threaded end of the coupling screw 42 (best shown in FIG. 9). Such frictional engagement will hold the locking sleeve 43 in place in its surrounding engagement with the coupling screw 42 after the locking sleeve 43 has been moved upwardly to its second position along the leg assembly support arm 38. Thus, each leg assembly (e.g., 17-2) will remain locked at its upstanding position until a manual pushing force is applied to locking sleeve 43, whereby to cause the dome 45 to be disengaged and the sleeve 43 to move away from the threaded end of screw 42.

The slot 47 of the locking sleeve 43 which lies opposite the dome 45 is dimensioned to accommodate therewithin the head of the coupling screw 42 when the sleeve 43 is moved upwardly to its aforementioned second position along the leg assembly support arm 38 and the dome 45 of sleeve 43 is positioned in surrounding frictional engagement with the threaded end of screw 42 (also best shown in FIG. 9).

Turning now to FIGS. 10-13 of the drawings, details are provided of the pair of pull-out wheels 7 that are coupled to and rotatable between outside and inside positions relative to the bottom of the folding table 1. As an important feature of this invention and as will now be disclosed, the pull-out wheels 7 can be rotated in a first direction away from the bottom of the folding table 1 so as to lie at their outside position adjacent opposite sides of the table 1 in the manner shown in FIG. 10 prior to the table being rotated to its folded configuration of FIGS. 1-3 at which to function as a cart and roll from one location to another. The pull-out wheels 7 can also be rotated in an opposite direction towards the bottom of the folding table 1 so as to lie at their inside position below one end 3 of the table 1 in the manner shown in FIG. 12 when the table is in its unfolded configuration at which a variety of food, beverages and other articles may be placed on the top thereof.

A pair of pivot support brackets 68 and 70 are located at each side of the table 1 so as to bridge the interface (designated 95 in FIG. 12) that separates the opposite table ends 3 and 5. One of the pivot support brackets 68 is connected to the frame member 18 which runs along one side of the table end 3, and the other pivot support bracket 70 is connected to the frame member 20 which runs along the adjacent side of the opposing table end 5. The pair of pivot support brackets 68 and 70 are held in spaced parallel alignment with one another by a cylindrical bushing 71, and the earlier mentioned pivot bolt 72 extends through the bushing 71 and between brackets 68 and 70. The pivot support brackets 68 and 70 rotate in opposite directions around the pivot bolt 72 at the same time that the opposite ends 3 and 5 of the folding table 1 are rotated towards one another by which to lie face-to-face so that the table will be in its folded configuration (of FIGS. 1-3). In the alternative, the opposite ends 3 and 5 of the table 1 can be rotated around the pivot bolt 72 and pulled away from one another so that the table ends 3 and 5 will now lie end-to-end where the table will be in its unfolded configuration (of FIGS. 4 and 5).

A pair of spaced, parallel aligned axle tube braces 74 are located at each side of the table 1 to be interfaced with one of the pair of pull-out wheels 7. The axle tube braces 74 are connected below the table end 3 to a wheel mounting cross bar 76 that extends laterally across the bottom of the table between the opposing frame members 18. Each of the pair of axle tube braces 74 has an inside wheel stop (i.e., detent) 78 and an outside wheel stop 80 formed therein and spaced apart therefrom.

Each one of the pair of pull-out wheels 7 of the folding table 1 has an axle 79 (best shown in FIG. 13) that extends inwardly through an opening 81 (of FIG. 13) formed in a first end of a respective wheel axle tube 82 for receipt by and connection to a wheel axle receptacle 83. The opposite end of each wheel axle tube 82 is pivotally connected between the pair of axle tube braces 74 by a fastener (e.g., a bolt) 84 that extends between the braces 74 and through the wheel axle tube 82. A (e.g., coil) spring 86 extends axially within the wheel axle tube 82. A spring locking post 88 extends laterally across the first end of the wheel axle tube 82 to engage and retain the front of the coil spring 86 located within axle tube 82. The rear of the coil spring 86 is attached to the fastener bolt 84 to which the opposite end of the wheel axle tube 82 is pivotally connected. A wheel locking peg 91 projects outwardly from each side of the wheel axle tube 82.

Figure 13:
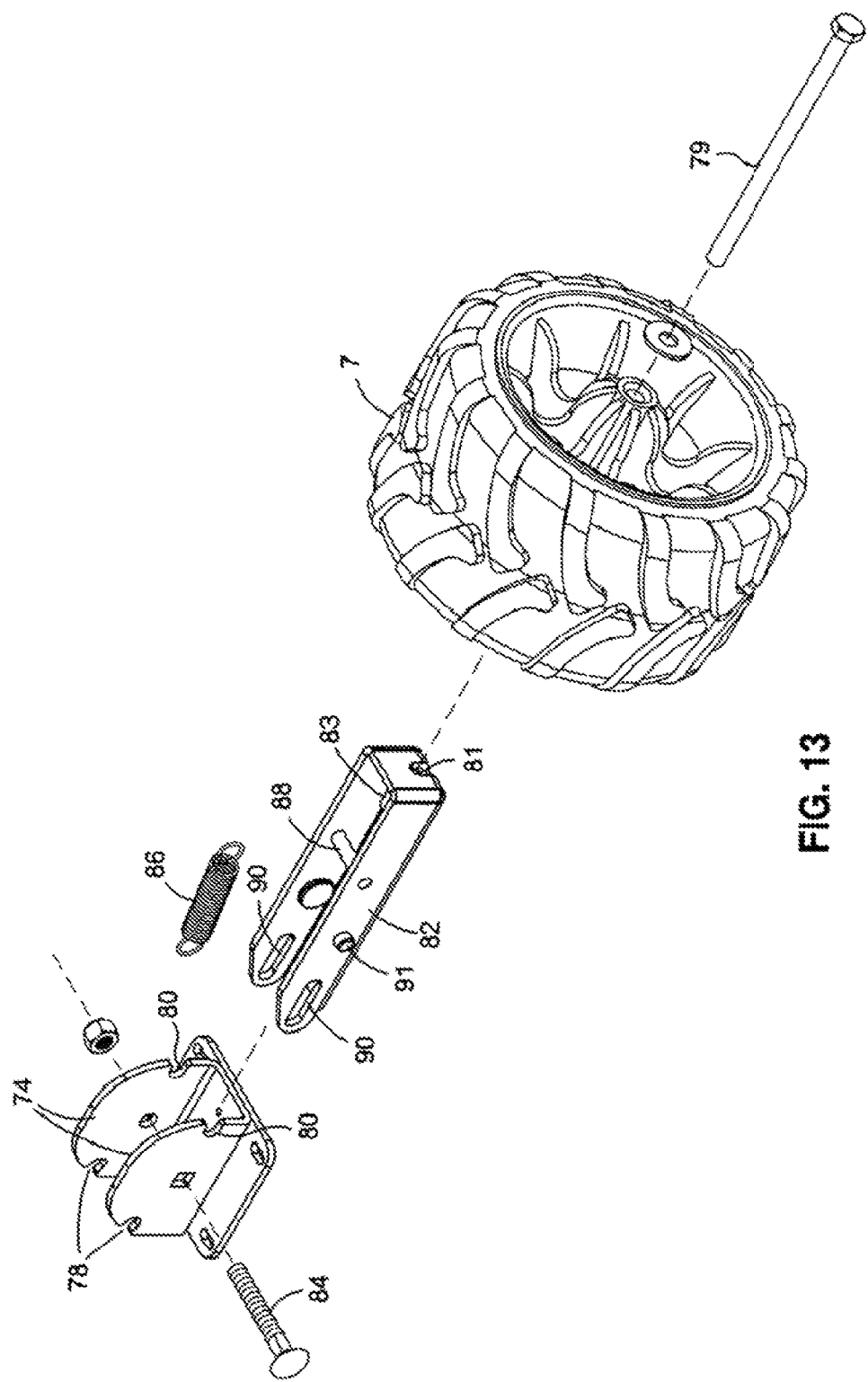
FIG. 13 is an exploded view to illustrate the pivotal connection of the pull-out wheel shown in FIGS. 10-12 to a pair of braces that are affixed to the bottom of the folding table so that the wheel is rotatable from a position lying adjacent one side of the table as shown in FIG. 10 to a position lying below the bottom of the table as shown in FIG. 12.

As is best shown in FIG. 13, an axially extending slot 90 is formed through each of the opposite sides of the wheel axle tube 82 at a location where axle tube 82 is received between the pair of axle tube braces 74. The fastener bolt 84 to which the wheel axle tube 82 is pivotally connected extends through the axle tube at the slots 90 thereof. The slots 90 that are formed in the sides of the wheel axle tube 82 are sized to be moved back and forth with respect to the fastener bolt 84 for an important purpose that will soon be explained.

Figure 12:
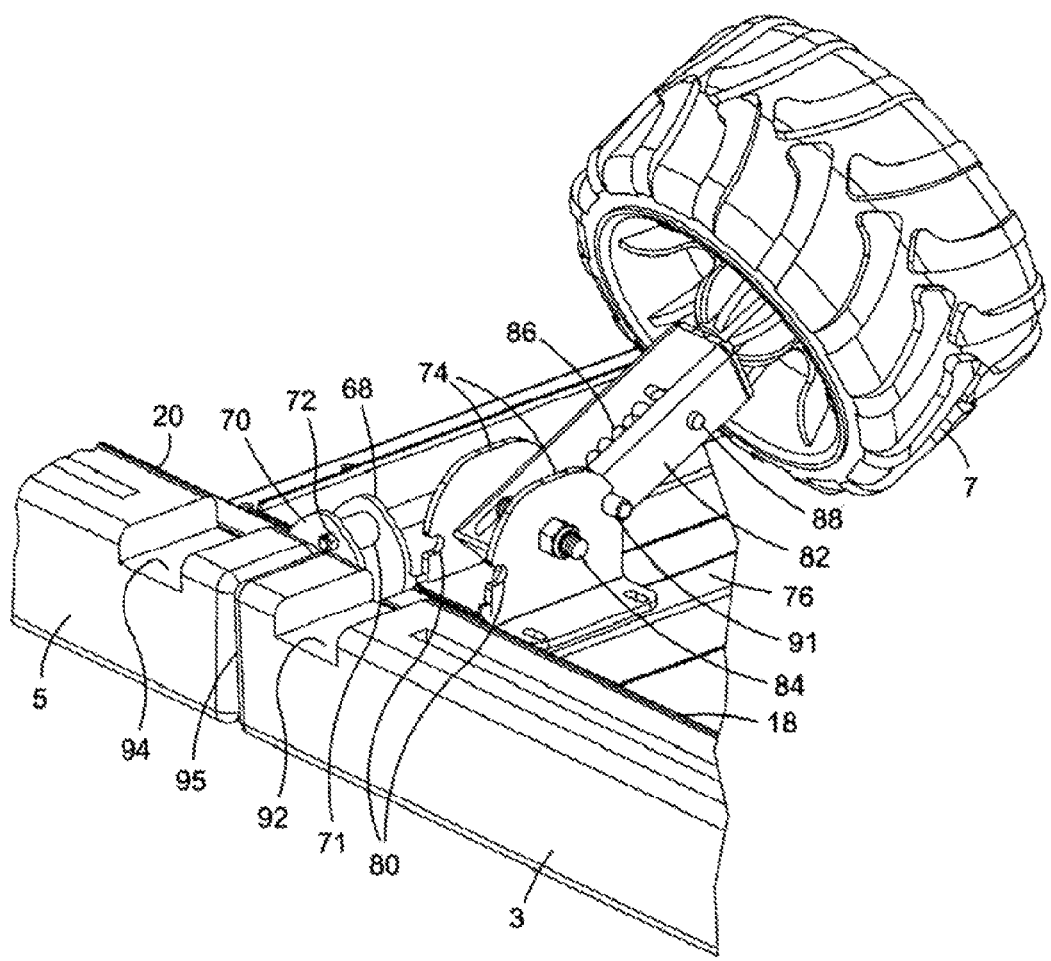
FIG. 12 shows the pull-out wheel of FIG. 11 after being rotated towards and lying below the bottom of the folding table.

As is best shown in FIG. 12, a pair of axle tube cavities (only one pair of which 92 and 94 being visible) are molded into the respective ends 3 and 5 of the folding table 1 at each of the opposite sides thereof. The wheel axle tube cavities 92 and 94 lie adjacent one another at opposite sides of the interface 95 which separates the opposing table ends 3 and 5. Each wheel axle tube cavity 92 and 94 is sized to receive therewithin the wheel axle tube 82.

Figure 10:
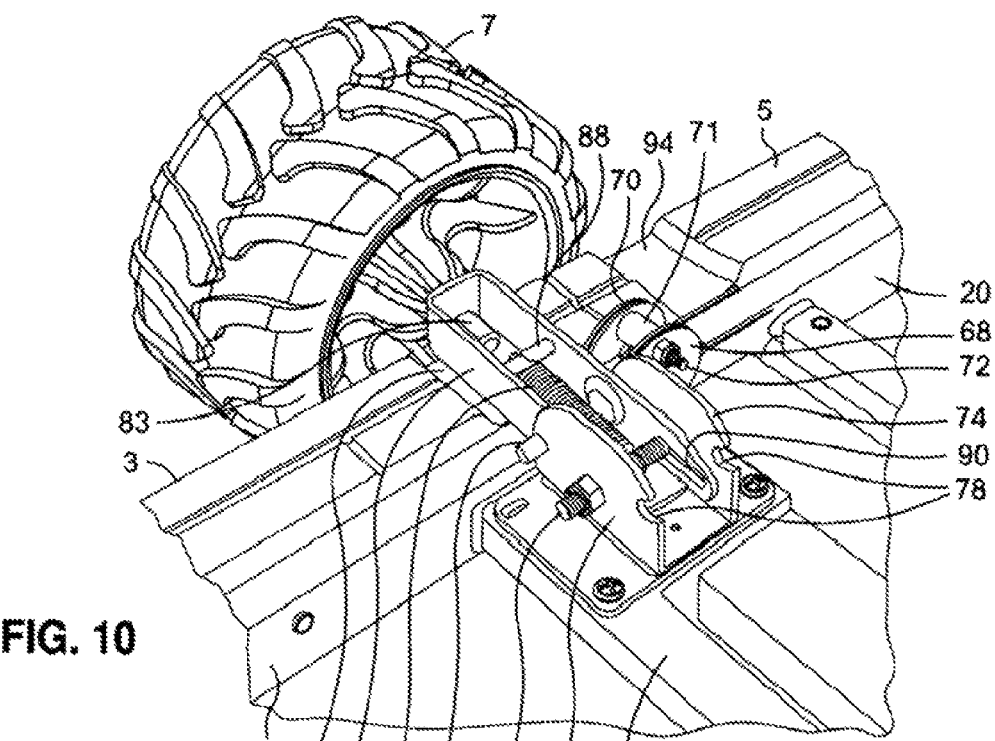
FIG. 10 is an enlarged detail taken from FIG. 4 showing one of the pair of pull-out wheels pivotally coupled to and extending outwardly from the bottom of the folding table so as to lie adjacent one side of the table in its unfolded configuration.

As previously described, FIG. 10 shows one of the pair of pull-out wheels 7 lying at its outside position extending outwardly from the bottom of the folding table 1 prior to the table being rotated around the pivot bolt 72 to its folded configuration so that the opposite ends 3 and 5 of the table 1 will lie face-to-face. In this case, the wheel locking pegs 91 which project from opposite sides of the wheel axle tube 82 are received in the outside wheel stops 80 that are formed in respective ones of the pair of axle tube braces 74. The coil spring 86 that extends axially within the wheel axle tube 82 and is attached between the fastener bolt 84 and the spring locking post 88 is initially relaxed.

With the pull-out wheel 7 lying outside the table 1, the bottom of the wheel axle tube 82 shown in FIG. 10 is seated within the wheel axle tube cavity 92 that is formed in one side of the table end 3. When the folding table 1 is folded and the end 5 of the table 1 is rotated around the pivot bolt 72 so as to lay over and against the opposite table end 3, the table ends 3 and 5 are latched together by the locking latches 10 and 12 (of FIGS. 1-3) so that the folding table can function as a cart and roll from place-to-place when a pulling force is applied to the pull-out handle 9 (of FIGS. 2 and 3). In this same regard, the wheel axle cavity 94 that is formed in one side of the table end 5 will now lie over and cover the wheel axle tube 82. Therefore, the wheel axle tube 82 is surrounded by and captured between the opposing wheel axle tube cavities 92 and 94 to hold the pull-out wheel 7 in place in its aforementioned outside position.

Figure 11:
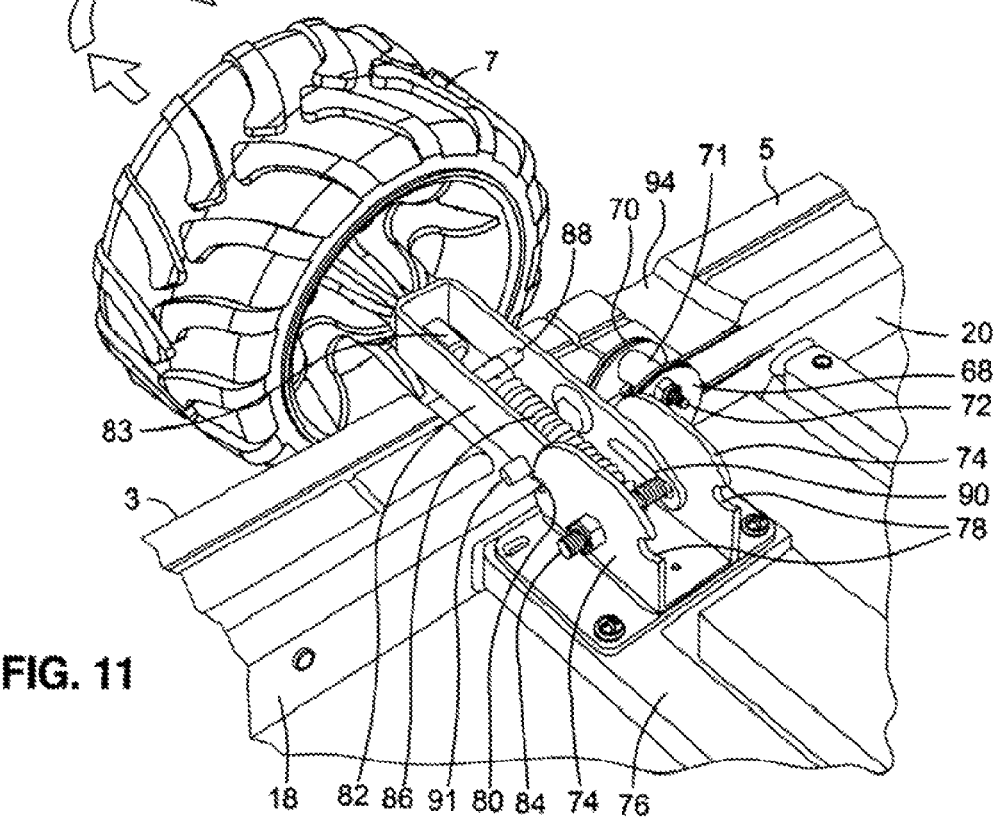
FIG. 11 shows the pull-out wheel of FIG. 10 being pulled out and away from the side of the folding table in order for the wheel to be rotated towards the bottom of the table.

Prior to the folding table 1 being rotated at the pivot bolt 72 to its folded configuration, and with the opposite ends 3 and 5 of the table still aligned end-to-end one another as shown in FIG. 11, an outward pulling force is applied to the pull-out wheel 7. Because the axle of the wheel 7 is connected to the wheel axle tube 82 at the wheel axle receptacle 83 thereof, the pulling force applied to wheel 7 is transferred to the wheel axle tube 82, whereby to pull the wheel axle tube 82 outwardly and away from one side of the folding table 1 by way of the wheel axle tube cavity 92 molded therewithin.

As the wheel axle tube 82 is pulled outwardly and away from the side of the table 1, the slots 90 that are formed in opposite sides of the wheel axle tube 82 are pulled outwardly with axle tube 80 so as to move over and past the fastener bolt 84 which remains stationary through the axle tube 82 and between the pair of axle tube braces 74. Inasmuch as the front of the compression spring 86 is connected to the spring locking post 88 which extends laterally across the outwardly moving wheel axle tube 82 and the rear of the spring 86 is connected to the stationary fastener bolt 84, the compression spring 86 is pulled outwardly and stretched by the axle tube 82. At the same time, the wheel locking pegs 91 that are carried at opposite sides of the wheel axle tube 82 will be correspondingly pulled out of the outside wheel stops 80 that are formed in the pair of axle tube braces 74.

With the coil spring 86 still stretched, the pull-out wheel 7 is rotated with the wheel axle tube 82 in a first direction (represented by the reference arrow 93 in FIG. 11) around the fastener bolt 84 until the wheel 7 is located at its inside position lying below the table end 3. Once the pull-out wheel 7 and the wheel axle tube 82 are positioned at the bottom of the table 1 in the manner shown by FIG. 12, the pulling force that has been heretofore applied to wheel 7 is terminated. In this case, the spring 86 which was formerly stretched will now be able to contract to its initial relaxed shape.

The contraction of the spring 86 automatically pulls the wheel axle tube 82 back towards the stationary fastener bolt 84 to which the rear of spring 86 is connected. At the same time, the slots 90 formed through the axle tube 82 will now move inwardly over and past the fastener bolt 84 that extends through the axle tube 82 and between the axle tube braces 74. Accordingly, the wheel locking pins 91 that project from the opposite sides of the wheel axle tube 82 are pulled by the spring 86 into locking engagement with the axle tube braces 74 at the inside wheel stops 78 formed therein so as to hold the wheel 7 in place at its inside position lying below the bottom of the folding table 1.

When it is desirable to rotate the pull-out wheels 7 in an opposite direction (opposite the direction of the reference arrow 93 shown in FIG. 11) from their inside position lying below the table 1 to their outside position lying adjacent the opposite sides of the table, a pulling force is once again applied to each wheel and the wheel axle tube 82 to which the wheel is connected. The wheel locking pegs 91 which project from each wheel axle tube 82 will now be removed from the inside wheel stops 78 formed in the axle tube braces 74 to permit each wheel axle tube 82 to simultaneously rotate around and slide outwardly from the stationary fastener bolt 84 in the manner previously described.

Referring once again to FIGS. 14 and 15 of the drawings, the folding table 1 is shown in its unfolded configuration with the opposite ends 3 and 5 thereof located end-to-end one another and the leg assemblies 17-1 and 17-2 rotated to their upstanding position extending downwardly from the bottom of the table so that the feet 34 of the pairs of telescoping table legs 26 lie against the ground. Each of the pull-out handle 9 and the retractable chair rack 14 is shown pulled outwardly from the respective ends 3 and 5 of the table. FIG. 15 shows the side rails 59 of the chair rack 14 bent upwardly at the hinges 62 so as to be capable of engaging and transporting a stack of folding chairs (designated 16 in FIGS. 1-3). In this regard, the chair rack 14 will typically be bent upwardly only when the folding table 1 is in its folded configuration at which to function as a cart suitable for carrying the chairs 16.

FIGS. 14 and 15 also show the pull-out wheels 7 rotated to their inside position lying below the bottom of the folding table 1. That is, when the table 1 is in its unfolded configuration, the wheels 7 are advantageously positioned at a non-obtrusive location tucked underneath the table so as not to interface with individuals who are seated around the table to access the articles which have been laid thereon. FIG. 14 also shows the top of the folding table 1 and strings 96 of light emitting diodes 97 extending around the periphery of each end 3 and 5 of the table. Details of the strings 96 of light emitting diodes 97 will be provided when referring to FIGS. 25 and 26.

Figure 17:
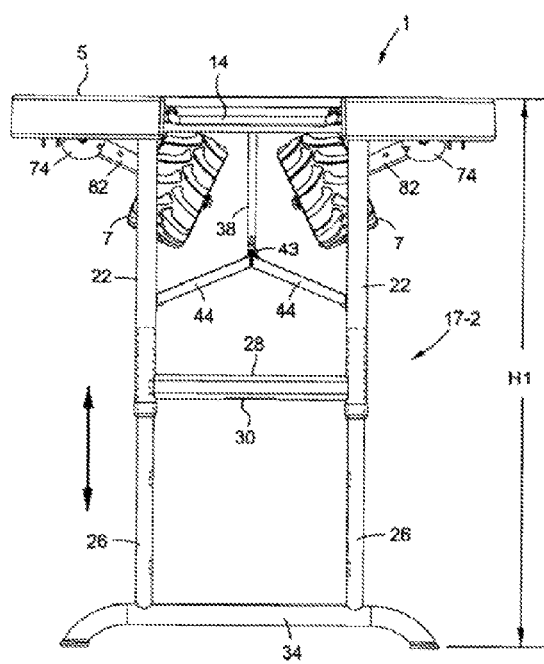
FIG. 17 shows the folding table in its unfolded configuration and one of the pair of rotatable leg assemblies as shown in FIGS. 14 and 15 having a pair of telescoping legs extending outwardly from a respective pair of hollow leg tubes for holding the table at a first elevation above the ground.
Figure 18:
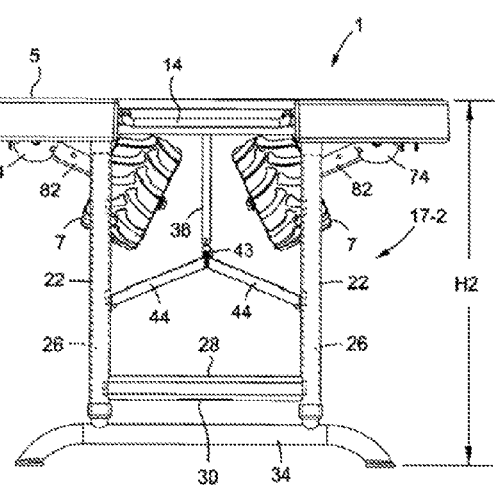
FIG. 18 shows the folding table of FIG. 17 after the pair of hollow leg tubes slide over the pair of telescoping legs so that the telescoping legs are received inwardly through the leg tubes for holding the folding table at a different elevation above the ground.

Turning now to FIGS. 17 and 18 of the drawings, the folding table 1 is shown in its unfolded configuration with the pair of pull-out wheels 7 rotated to their inside position tucked below the bottom of the table so as to be out of the way of individuals who use the table. As previously explained when referring to FIGS. 4 and 5, the elevation of the table 1 above the ground is selectively adjustable. When each of the leg assemblies (e.g., 17-2) is rotated downwardly from the bottom of the table 1 to its upstanding position, the leg release push-button 30 of the leg locking cross bar 28 may be depressed. With the push-button 30 depressed, the telescoping table legs 26 can be either pulled outwardly from or pushed inwardly through their respective hollow leg tubes 22.

FIG. 17 shows the pair of telescoping table legs 26 after being pulled outwardly from the hollow leg tubes 22 such that the table 1 stands at a maximum tall height H1 above the ground. FIG. 18 shows the telescoping legs 26 after being pushed inside the hollow leg tubes 22 such that the elevation of the table 1 is adjusted to a minimum height H2 above the ground. It is to be understood that the elevation of the table 1 can be adjusted to other heights between H1 and H2.

Referring concurrently now to FIGS. 19-22 of the drawings, details are provided of the operation of the leg release push-button 30 of the leg locking cross bar 28 which is connected between and extends through the pair of hollow leg tubes 22 of each of the rotatable leg assemblies 17-1 and 17-2 that are pivotally connected to the bottom of the folding table 1 below the respective opposite ends 3 and 5 thereof. As previously described, the opposite ends of each leg locking cross bar 28 communicate with one pair of the telescoping table legs 26 of the pairs of table legs from the leg assemblies 17-1 and 17-2. As was also previously described, the leg release push-button 30 from each cross bar 28 is manually actuated so that the height of the table 1 above the ground can be selectively adjusted.

Each leg locking cross bar 28 includes a pair of identical generally flat leg latches 102 (best shown in FIGS. 21 and 22) that are arranged in spaced end-to-end alignment so as to be movable relative to one another through the cross bar. Each leg latch 102 has a hook 104 located at an inside end thereof and a locking tab 106 located at the opposite outside end. The hook 104 has a sloping edge 105 for a purpose that will soon be explained. A spring receiving cavity 108 is formed in each leg latch 102 between the hook 104 and the locking tab 106. Extending inwardly from one end of the spring receiving cavity 108 is a spring retaining nub 110. Located in the leg latch 102 adjacent the spring receiving cavity 108 is a guide slot 112.

Figure 19:
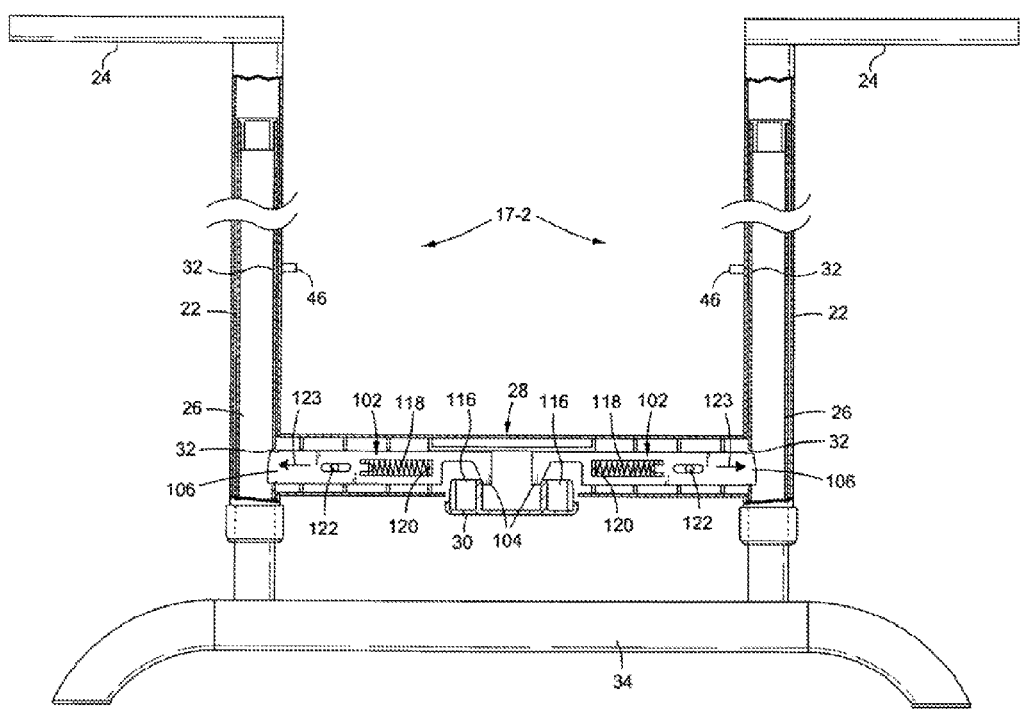
FIG. 19 shows the rotatable leg assembly of FIGS. 17 and 18 and a leg locking cross bar extending between the pair of hollow leg tubes and having push-button actuated leg locking tabs located at the opposite ends thereof that are received by respective ones of the pair of telescoping legs for preventing the hollow leg tubes from sliding over the pair of telescoping legs in order to prevent the elevation of the folding table from being adjusted above the ground.

As is best shown in FIGS. 19 and 20, the manually actuated leg release push-button 30 of the leg locking cross bar 28 of each leg assembly (e.g., 17-2) that is located at each end 3 and 5 of the folding table 1 includes a pair of locking tab position control posts 116 which are surrounded by the hooks 104 and cooperate with the sloping edges 105 thereof at respective ones of the leg latches 102. That is, the leg release push-button 30 and the pair of leg latches 102 are positioned relative to one another within the leg locking cross bar 28, such that the locking tab position control posts 116 of the push-button will engage and ride over the sloping edges 105 of the hooks 104 at the inside end of each leg latch 102 in response to the push-button 30 being actuated.

A (e.g., coil) spring 118 is located in each spring receiving cavity 108 of each leg latch 102. One end of spring 118 surrounds the spring retaining nub 110 which extends into cavity 108. The opposite end of the spring 118 is connected to a stationary spring retainer 120 that is fixedly connected to the inside of leg locking cross bar 28. A stationary guide pin 122 that is also fixedly connected inside the cross bar 28 is received through the guide slot 112.

FIG. 19 shows the pair of leg latches 102 positioned at opposite ends of the leg locking cross bar 28 with the locking tab 106 of each leg latch 102 moved into receipt by one of the plurality of leg locking slots 32 (best shown in FIG. 5) that is formed in each of the pair of telescoping legs 26 that are received by and slidable through respective hollow legs tubes 22 of the leg assembly 17-2 of the folding table 1.

More particularly, prior to the leg release push-button 30 being manually actuated (i.e., depressed), each spring 118 of each leg latch 102 which is connected at one end thereof to the stationary spring retainer 120 is relaxed and expanded within its spring receiving cavity 108 so as to apply an outward pushing force (in the direction of reference arrows 123 of FIG. 19) to the leg latch 102. The outward pushing force causes the guide slot 112 to move outwardly past the stationary guide pin 122 while, at the same time, urging the locking tab 106 of leg latch 102 to move outwardly and into removable receipt by one of the plurality of the leg locking slots 32 that are formed in one of the telescoping table legs 26. Accordingly, the telescoping leg 26 will be locked in place within its hollow leg tube 26 by the locking tab 106 of the leg latch 102 so that the table 1 will be held at a first elevation (designated 1-12 in FIG. 18) above the ground.

FIG. 20 shows the pair of leg latches 102 relocated within the leg locking cross bar 28 when it is desirable to selectively adjust the elevation of the folding table 1 by applying a pushing force to actuate the leg release push-button 30. Depressing and applying the pushing force to the push-button 30 (in the direction of the reference arrow 124 shown in FIG. 20) causes the locking tab position control posts 116 of push-button 30 to ride over and against the sloped edges 105 of the hooks 104 of the leg latches 102 to correspondingly cause an inward pulling force to be applied (in the direction of the reference arrows 126 of FIG. 20) to the leg latches 102. The inward pushing force causes the guide slots 112 to move inwardly past the stationary guide pins 122 while, at the same time, pulling the locking tabs 106 of the leg latches 102 inwardly and out of their former receipt by the leg locking slots 32 formed in the telescoping table legs 26. Likewise, because one end of each of the springs 118 is connected to a stationary spring retainer 120, the springs 118 are compressed within their spring receiving cavities 108.

With the locking tabs 106 of the leg latches 102 removed from the leg locking slots 32 of the pair of telescoping table legs 26, the telescoping legs 26 are now unlocked so that their position within the pair of hollow leg tubes 26 of leg assembly 17-2 can be changed. In the case of FIG. 20, where the foot 34 of the leg assembly 17-2 is seated on the ground to support the weight of the folding table 1, a user grasps the leg locking cross bar 28 with his hand while continuing to depress the push-button 30. The user then applies a lifting force (in the direction of the reference arrow 124 of FIG. 20) to the leg locking cross bar 28 to raise the cross bar and the hollow leg tubes 22 between which the cross bar 28 is connected. Accordingly, the hollow leg tubes 22 will slide upwardly and over the pair of telescoping table legs 26 so that the elevation of the folding table 1 above the ground is increased to a height (designated H1) shown in FIG. 17.

Once the desired elevation of the table 1 is achieved at or between the heights H1 and H2, the user terminates the pushing force being applied to the leg release push-button 30. The formerly compressed springs 118 are now able to expand back to their relaxed shape so as to cause an outward pushing force to be once again applied to each of the leg latches 102. The pushing force correspondingly causes the locking tabs 106 of the leg latches 102 to be moved into receipt by different ones of the leg locking slots 32 from the pluralities of locking slots that are formed in the telescoping table legs 26 by which the table legs 26 are once again locked in place within the hollow leg tubes 22.

Figure 23:
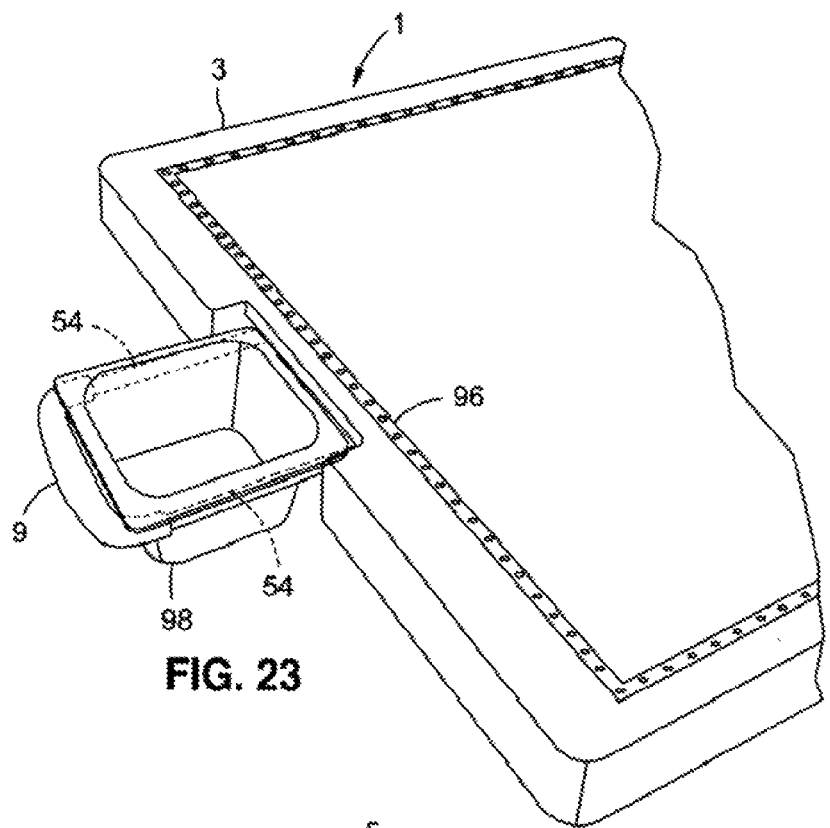
FIG. 23 shows the pull-out handle of FIGS. 14 and 15 extending outwardly from one end of the folding table in its unfolded configuration within which to surround and retain a first container having a first size.

FIG. 23 of the drawings shows the pull-out handle 9 pulled outwardly from the first end 3 of the folding table 1. As was previously described, with the handle 9 pulled outwardly from the folding table 1 in its folded configuration (of FIGS. 1-3) so as to function as a cart, a pulling force applied to the handle 9 causes the table to roll on the pair of wheels 7 from place-to-place. However, the handle 9 and its telescoping legs 54 can also be used to surround and retain a container 98 when the folding table 1 is in its unfolded configuration (best shown in FIG. 14). The container 98, which must be sized to fit within the area that is surrounded by the handle 9 and its legs 54, can be filled with any of a variety of articles (e.g., eating utensils) Therefore, the size of the container 98 determines the distance the handle 9 must be pulled outwardly from the table end 3.

Figure 24:
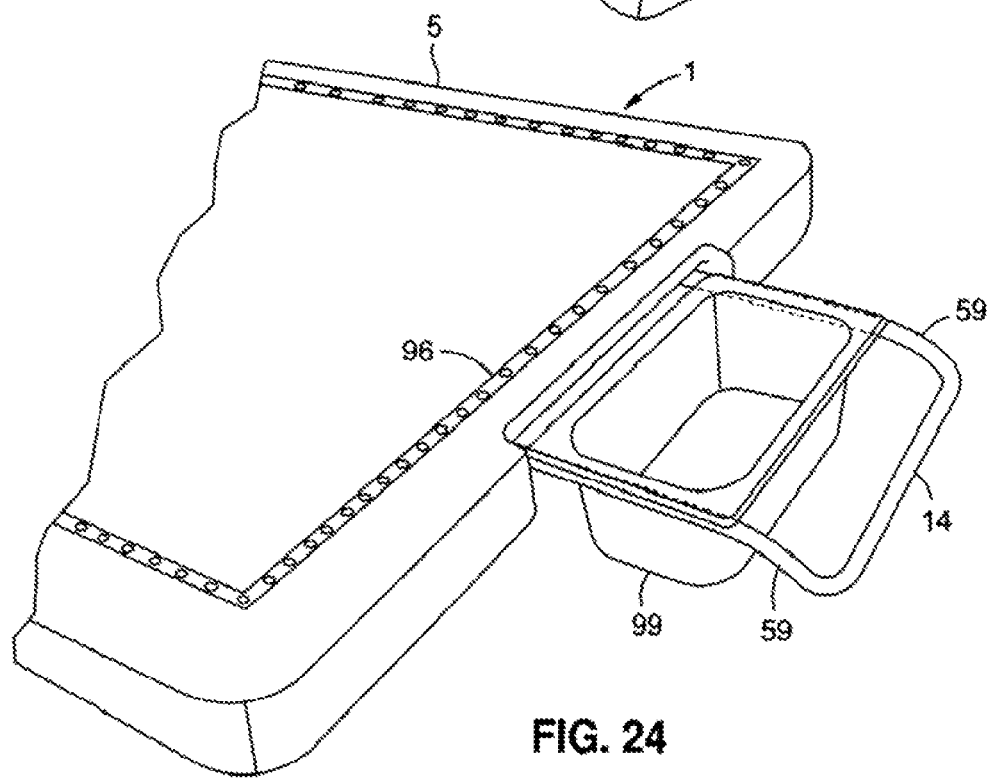
FIG. 24 shows the retractable chair rack of FIGS. 14 and 15 extending outwardly from the opposite end of the folding table in its unfolded configuration within which to surround and retain a different container having a different size.

FIG. 24 of the drawings shows the retractable chair rack 14 pulled outwardly from the opposite end 5 of the folding table 1. As was previously described, with the chair rack 14 pulled outwardly from the folding table 1 in its folded configuration so as to function as a cart, the side rails 59 of the chair rack can be bent upwardly at hinges 62 as shown in FIG. 15 so as to be moved into engagement with and transport one or more folding chairs (designated 16 in FIGS. 1-3). However, the chair rack 14 and its side rails 59 can also be used to surround and retain a different container 99 when the folding table 1 is in its unfolded configuration. The container 99, which must be sized to fit within the area that is surrounded by the chair rack 14 and its side rails 59, can be filled with a variety of different articles (e.g., beverage containers). The size of the container 99 determines the distance the chair rack 14 must be pulled outwardly from the table end 5.

FIGS. 25 and 26 of the drawings show the top of the folding table 1 in its unfolded configuration with strings 96 of conventional light emitting diodes (LEDs) 97 extending around each of the opposite ends 3 and 5 of the table. The LED strings 96 are connected in electrical series and operated by a control unit and battery pack that are affixed to the bottom of the table 1. In this manner, power may be provided to each string 96 to illuminate the LEDs 97 thereof. The strings 96 of LEDs 97 provide the folding table 1 with an ornamental feature where the individual LEDs 97 can be illuminated in one or more colors that correspond to an individual's sports team, country, or the like.

As is best shown in FIG. 26, each LED 97 is recessed so as to lie below the top of the table 1. The recessed LEDs 97 are covered by a protective and optically transparent filler material 100 so as to create a smooth surface running across the table top.

The invention claimed is:

1. A folding table comprising:
a top and a bottom;
a first table end having first and second side walls spaced from and lying opposite one another and an end wall running between the first and second side walls of said first table end;
an opposite table end having first and second side walls spaced from and lying opposite one another and an end wall running between the first and second side walls of said opposite table end so that the first and the second side walls and the end walls of said first and opposite table ends surround the bottom of said folding table, said opposite table end being pivotally coupled to said first table end such that said first and opposite table ends are rotatable so as to lie facing one another at which said folding table is in a folded configuration or end-to-end one another at which said folding table is in an unfolded configuration; and
a pair of wheels pivotally connected to the bottom of said folding table so as to be rotatable relative to said bottom when said folding table is in said unfolded configuration, said pair of wheels rotating away from one another and moving past respective ones of the first and second side walls of the first of said first and opposite table ends to a first position located laterally outward from the bottom of said folding table and rotating towards one another and moving past the respective ones of said first and second side walls to a second position located below the bottom of said folding table.

2. The folding table recited in claim 1, further comprising a first pivot support bracket connected to and rotatable with said first table end, a second pivot support bracket connected to and rotatable with said opposite table end, and a table pivot extending between said first and second pivot support brackets, said first and opposite table ends and said first and second pivot brackets respectively connected thereto being rotatable at said table pivot by which said folding table is correspondingly rotated between said folded and said unfolded configurations.

3. The folding table recited in claim 1, further comprising a pull-out handle having a pair of telescoping legs; and a pair of hollow handle tubes attached to the bottom of said folding table, said pair of telescoping legs being received by and slidable outwardly from respective ones of said pair of hollow handle tubes at which a pulling force applied to said pull-out handle causes said folding table to roll from place-to-place on said pair of wheels when said table is in said folded configuration.

4. The folding table recited in claim 1, further comprising a retractable rack having a pair of telescoping legs and a hinge located in each of said pair of legs; and a pair of hollow rack tubes attached to the bottom of said folding table, said pair of telescoping legs being received within and slidable outwardly from respective ones of said pair of hollow rack tubes, at which said pair of telescoping legs are bent at said hinges so as to be in position to engage and transport an article when said folding table rolls from place-to-place on said pair of wheels and said folding table is in said folded configuration.

5. The folding table recited in claim 1, further comprising a wheel axle tube having first and opposite ends, a first of said pair of wheels having an axle extending therefrom and connected to the first end of said wheel axle tube, and the opposite end of said wheel axle tube being pivotally connected to the bottom of said folding table at the first of said first and opposite ends thereof so that said wheel axle tube is rotatable relative to the bottom of said table for correspondingly rotating said first wheel between said first and second positions.

6. The folding table recited in claim 5, wherein the first side wall of the first end of said folding table has a first wheel axle tube cavity formed therein and the first side wall of the opposite end of said folding table has a second wheel axle tube cavity formed therein, the wheel axle tube to which the axle of the first of said pair of wheels is connected being received within the first wheel axle tube cavity formed in the first side wall of said first table end when said folding table is in said unfolded configuration and said first wheel is located at said first position, and said wheel axle tube being received within each of and surrounded by the first and second wheel axle tube cavities formed in respective ones of the first side walls of the first and opposite ends of said folding table when said table is in said folded configuration and said first wheel is located at said first position.

7. The folding table recited in claim 5, further comprising a pair of axle tube braces spaced from one another and attached to the bottom of said folding table at the first of said first and opposite ends thereof, and a coupler extending between said pair of axle tube braces, the opposite end of said wheel axle tube being located between said pair of axle tube braces and pivotally connected to said coupler extending between said pair of axle tube braces so that said wheel axle tube is rotatable at said coupler relative to the bottom of said table.

8. The folding table recited in claim 7, further comprising a spring locking post extending laterally through the first end of said wheel axle tube; and a spring connected between said spring locking post and the coupler to which the opposite end of said wheel axle tube is pivotally connected.

9. The folding table recited in claim 8, wherein said wheel axle tube has a pair of opposite sides extending between the first and opposite ends thereof and a slot formed in each of said first and opposite sides, the first wheel of said pair of wheels being responsive to pulling and rotational forces applied thereto, whereby to cause said first wheel and said wheel axle tube connected to the axle of said first wheel to rotate with one another past the first side wall of the first end of said folding table at which to lie laterally outward from the bottom of said folding table, such that the spring that is connected to the spring locking post at the first end of said wheel axle tube is stretched and the slots formed in the first and opposite sides of said wheel axle tube are pulled over and past the coupler to which the opposite end of said wheel axle tube is pivotally connected so that said wheel axle tube is rotated at said coupler for correspondingly rotating said first wheel between said first and second positions.

10. The folding table recited in claim 9, wherein at least one of the pair of opposite sides of said wheel axle tube has a wheel locking peg projecting outwardly therefrom and at least one of said pair of axle tube braces has first and second locking detents formed therein and spaced from one another, said spring contracting when the pulling and rotational forces being applied to said first wheel are terminated so that said first wheel and said wheel axle tube connected to the axle of said first wheel are automatically pulled by said spring towards the bottom of said folding table, whereby the wheel locking peg projecting from the at least one side of said wheel axle tube is correspondingly pulled into receipt by one of said first or second locking detents depending upon whether said first wheel is rotated to said first position or to said second position.

11. The folding table recited in claim 2, further comprising first and second pairs of legs located at respective ones of the first and opposite ends of said folding table and rotatable in a first direction so as to lie adjacent the bottom of said folding table when said table is in said folded configuration, and rotatable in an opposite direction extending outwardly from the bottom of said folding table at which to support said folding table above the ground when said table is in said unfolded configuration.

12. The folding table recited in claim 11, further comprising a pair of hollow leg tubes rotatable connected to the bottom of said folding table below said first table end, the first pair of said first and second pairs of legs being received within and slidable through respective ones of said pair of hollow leg tubes, said first pair of legs positioned inwardly of said pair of hollow leg tubes and said pair of hollow leg tubes rotating in said first direction so as to lie adjacent the bottom of said folding table when said folding table is in said folded configuration, and said pair of hollow leg tubes rotating in said opposite direction to extend outwardly from the bottom of said folding table when said table is in said unfolded configuration at which said first pair of legs are slidable outwardly from said pair of hollow leg tubes so as to support said folding table above the ground.

13. The folding table recited in claim 12, further comprising:
  a leg brace including a pair of leg brace support arms, each of said leg brace support arms having first and opposite ends, the first end of each of said pair of leg brace support arms being pivotally connected to a respective one of said pair of hollow leg tubes;
  a leg assembly support arm having first and opposite ends, the first end of said leg assembly support arm being pivotally connected to the bottom of the folding table and the opposite end of said leg assembly support arm being pivotally connected to the opposite end of each of the pair of leg brace support arms of said leg brace by means of a pivot extending therethrough, such that said leg brace support arms and said leg assembly support arm are rotatable at said pivot relative to one another when said pair of hollow leg tubes rotate in said first and opposite directions; and
  a locking sleeve coupled to and slidable along said leg assembly support arm so as to surround said pivot and thereby prevent said pair of leg brace support arms and said leg assembly support arm from rotating relative to one another.

14. The folding table recited in claim 13, wherein said locking sleeve has a C-shape with a dome located at and projecting outwardly from a first side thereof and a slot extending continuously through the opposite side, the pivot which extends through the opposite end of each of the pair of leg brace support arms of said leg brace and the opposite end of said leg assembly support arm having first and opposite ends, said C-shaped locking sleeve surrounding said pivot such that the dome located at and projecting outwardly from the first side of said locking sleeve lies in frictional engagement with the first end of said pivot, and the opposite end of said pivot is located within the slot at the opposite side of said locking sleeve.

15. The folding table recited in claim 12, further comprising a leg locking cross bar having first and opposite ends and being connected between said pair of hollow leg tubes and communicating with the first pair of legs that are received within respective ones of said pair of hollow leg tubes, said leg locking cross bar also having a manually actuated leg release push-button and a leg lock located at each of the first and opposite ends of said leg locking cross bar and communicating with said leg release push-button,
  each leg of the first pair of legs having a plurality of leg locking holes formed therein and spaced axially from one another so that the leg locks at the first and opposite ends of said leg locking cross bar are removably received by first leg locking holes from the pluralities of leg locking holes formed in said first pair of legs to lock said first pair of legs at a first location within said pair of hollow leg tubes by which said folding table is held at a first elevation above the ground when said table is in said unfolded configuration, and
  said manually actuated leg release push-button of said leg locking cross bar being responsive to a pushing force applied thereto by which to cause the leg locks at the first and opposite ends of said cross bar to be removed from said first leg locking holes to permit said first pair of legs to slide through and be relocated within said pair of hollow leg tubes by which said folding table will be at a different elevation above the ground.

16. The folding table recited in claim 15, wherein the leg lock that is located at each of the first and opposite ends of said leg locking cross bar is a leg latch having first and opposite ends, and wherein the first end of the leg latch that is located at the first end of said leg locking cross bar has a locking tab that is removably received by the first leg locking hole that is formed in one of said first pair of legs, and the opposite end of the leg latch communicates with said manually actuated leg release push-button so as to be responsive to the pushing force applied to said push-button to cause said leg latch to move away from the one of said first pair of legs and the locking tab of said leg latch to be removed from the first leg locking hole formed in the one of said first pair of legs.

17. The folding table recited in claim 16, wherein the opposite end of the leg latch that is located at the first end of said leg locking cross bar has a slopping edge, and the manually actuated leg releases push-button has a locking tab position control post that communicates with said sloping edge, such that the pushing force applied to said leg release push-button causes the locking tab position control post of said push-button to ride over and against the sloping edge of said leg latch, such that said leg latch is moved away from the one of said first pair of legs and the locking tab at the first end of said leg latch is removed from the first leg locking hole formed in the one of said first pair of legs.

18. The folding table recited in claim 17, further comprising a spring having a first end connected to said leg latch and an opposite end connected to said leg locking cross bar, said spring being stretched when the pushing force is applied to said manually actuated leg release push-button and said leg latch moves away from the one of said first pair of legs, and said spring contracting when said pushing force is terminated so as to urge said leg latch to move towards the one of said first pair of legs, whereby the locking tab at the first end of said leg latch is removably received by a different one of the plurality of leg locking holes formed in the one of said first pair of legs.

19. The folding table recited in claim 1, further comprising a plurality of light emitting diodes extending around each of the first and opposite ends of said folding table and lying at the top of said table.

20. The folding table recited in claim 19, wherein each light emitting diode is recessed below the top of said folding table.

21. The folding table recited in claim 1, wherein said pair of wheels are rotated relative to the bottom of said folding table through an angle of greater than 90 degrees between said first position lying laterally outward from the bottom of said folding table and said second position located below the bottom of said folding table.

22. A folding table comprising a top, a bottom, a pair of sides lying opposite one another, and first and opposite table ends pivotally coupled to each other and rotatable so as to lie facing one another at which said folding table is in a folded configuration or end-to-end one another at which said folding table is in an unfolded configuration, said folding table further comprising:
a pair of wheels coupled to the first end of said folding table and located at one of a first position lying outside of said folding table and adjacent respective ones of the first and opposite sides of said folding table or at a second position lying below the bottom of said folding table;
a pull-out handle having a pair of telescoping handle legs and a pair of hollow handle tubes attached to the first end of said folding table, said pair of telescoping handle legs being received by and slidable outwardly from respective ones of said pair of hollow handle tubes at which to receive a pulling force for causing said folding table to roll from place-to-place on said pair of wheels when said table is in said folded configuration; and
a retractable rack having a pair of telescoping rack legs, a hinge located in each one of said pair of legs, and a pair of hollow rack tubes attached to the opposite end of said folding table, said pair of telescoping rack legs being received within and slidable outwardly from respective ones of said pair of hollow rack tubes at which said pair of telescoping rack legs are bent at said hinges so as to be in position to engage and transport an article at the top of said folding wagon when said folding table rolls from place-to-place on said pair of wheels and said folding table is in said folded configuration.

23. The folding table recited in claim 22, wherein said pair of wheels are movable between said first and second positions so as to be located at said first position when said folding table is in said folded configuration or at said second position when said folding table is in said unfolded configuration.

24. The folding table recited in claim 23, wherein said pair of wheels are pivotally coupled to the first end of said folding table so as to rotate relative to said first end between said first position when said folding table is in said folded configuration and said second position when said folding table is in said unfolded configuration.

25. The folding table recited in claim 24, wherein said pair of wheels have respective axles extending therefrom and being pivotally coupled to the bottom of the folding table below the first end of said table, said axles being rotatable relative to said first end to correspondingly cause said pair of wheels to rotate between said first position when said folding table is in said folded configuration and said second position when said folding table is in said unfolded configuration.

26. The folding table recited in claim 25, further comprising first and second wheel axle tubes connected to respective ones of the axles of said pair of wheels, said first and second wheel axle tubes being pivotally coupled to the bottom of said folding table below the first end thereof such that said first and second wheel axle tubes are rotatable relative to said first table end to correspondingly rotate said pair of wheels and said axles thereof between said first position when said folding table is in said folded configuration and said second position when said folding table is in said unfolded configuration.

27. A folding table comprising:
a top and a bottom and first and opposite sides;
first and opposite ends, the opposite end of said folding table being pivotally coupled to the first end of said folding table such that said first and opposite table ends are rotatable so as to lie facing one another at which said folding table is in a folded configuration or end-to-end one another at which said folding table is in an unfolded configuration;
a pair of wheels located adjacent respective ones of the first and opposite sides of said folding table and coupled to one of said first or opposite table ends by which to enable said folding table to roll from place-to-place;
a wheel coupler having first and opposite ends, the first end of said wheel coupler being connected to a first wheel of said pair of wheels, and the opposite end of said wheel coupler being pivotally coupled to the bottom of said folding table at the one of said first or opposite ends thereof so that said wheel coupler and said first wheel connected to said wheel coupler are rotatable relative to the bottom of said folding table; and
a spring attached to the bottom of said folding table and communicating with said wheel coupler,
the first wheel of said pair of wheels being responsive to pulling and rotational forces applied thereto when said folding table is in said unfolded configuration, whereby to cause said first wheel and said wheel coupler to rotate with one another relative to the bottom of said folding table so as to cause said spring to be stretched, said spring contracting when the pulling and rotational forces applied to said first wheel are terminated so that said first wheel and said wheel coupler are correspondingly pulled by said spring towards the bottom of said folding table.

28. The folding table recited in claim 27, further comprising a pair of wheel coupler braces that are spaced from one another and connected to the bottom of said folding table at the one of said first or opposite ends thereof; and a connector extending between said pair of wheel coupler braces, the opposite end of said wheel coupler being located between said pair of wheel coupler braces and pivotally coupled to the bottom of said folding table at said connector which extends between said pair of wheel coupler braces so that said wheel coupler is rotatable at said connector relative to the bottom of said folding table.

29. The folding table recited in claim 28, further comprising a spring locking post extending laterally through the first end of said wheel coupler, said spring having a first end connected to said spring locking post and an opposite end attached to the bottom of said folding table at the connector which extends between said pair of wheel coupler braces that are connected to the bottom of said folding table.

30. The folding table recited in claim 29, wherein said wheel coupler has a pair of opposite sides extending between the first and opposite ends thereof and a slot formed in each of said first and opposite sides, the spring which is connected to said spring locking post at the first end of said wheel coupler and which is stretched in response to the pulling and rotational forces being applied to said first wheel causing the slots formed in the first and opposite sides of said wheel coupler to be pulled over and past the connector to which the opposite end of said wheel coupler is pivotally connected so that said wheel coupler is rotated at said connector for correspondingly causing said first wheel and said wheel coupler to which said first wheel is connected to rotate with one another relative to the bottom of said folding table.

31. The folding table recited in claim 30, wherein at least one of the pair of opposite sides of said wheel coupler has a wheel locking peg projecting outwardly therefrom and at least one of said pair of wheel coupler braces has first and second locking detents formed therein and spaced from one another, said spring contracting when the pulling and rotational forces being applied to said first wheel are terminated so that said first wheel and said wheel coupler are pulled by said spring towards the bottom of said folding table, whereby the wheel locking peg projecting from the at least one side of said wheel coupler is correspondingly pulled into receipt by one of said first or second locking detents.

* * * * *